US008055689B1

(12) United States Patent
Wookey

(10) Patent No.: US 8,055,689 B1
(45) Date of Patent: Nov. 8, 2011

(54) METHODS AND SYSTEMS FOR DISTRIBUTING INFORMATION MODEL NODES IN MEMORY

(75) Inventor: Michael J. Wookey, Los Gatos, CA (US)

(73) Assignee: Oracle America, Inc., Redwood City, CA (US)

(*) Notice: Subject to any disclaimer, the term of this patent is extended or adjusted under 35 U.S.C. 154(b) by 913 days.

(21) Appl. No.: 11/080,896

(22) Filed: Mar. 14, 2005

(51) Int. Cl.
*G06F 12/00* (2006.01)

(52) U.S. Cl. ........................................ 707/814

(58) Field of Classification Search ............... 707/10, 707/206, 814
See application file for complete search history.

(56) References Cited

U.S. PATENT DOCUMENTS

| | | | | |
|---|---|---|---|---|
| 5,247,647 | A * | 9/1993 | Brown et al. | 714/1 |
| 5,398,334 | A * | 3/1995 | Topka et al. | 707/206 |
| 5,765,174 | A * | 6/1998 | Bishop | 707/206 |
| 6,026,073 | A * | 2/2000 | Brown et al. | 370/216 |
| 6,314,427 | B1 * | 11/2001 | Goldman et al. | 707/1 |
| 6,421,690 | B1 * | 7/2002 | Kirk, III | 707/206 |
| 6,834,382 | B2 | 12/2004 | Marso et al. | |
| 6,886,041 | B2 | 4/2005 | Messinger et al. | |
| 6,886,166 | B2 | 4/2005 | Harrison et al. | |
| 6,904,454 | B2 | 6/2005 | Stickler | |
| 6,920,476 | B2 | 7/2005 | McGann et al. | |
| 7,062,706 | B2 | 6/2006 | Maxwell et al. | |
| 7,246,104 | B2 | 7/2007 | Stickler | |
| 2002/0004796 | A1 * | 1/2002 | Vange et al. | 707/10 |
| 2002/0035482 | A1 | 3/2002 | Coble et al. | |
| 2002/0035617 | A1 | 3/2002 | Lynch et al. | |
| 2002/0091736 | A1 * | 7/2002 | Wall | 707/513 |
| 2002/0188497 | A1 | 12/2002 | Cerwin | |
| 2004/0059744 | A1 | 3/2004 | Duncan et al. | |
| 2004/0153447 | A1 * | 8/2004 | Hiratsuka et al. | 707/3 |
| 2005/0028080 | A1 | 2/2005 | Challenger et al. | |
| 2005/0192955 | A1 * | 9/2005 | Farrell | 707/5 |
| 2006/0117005 | A1 | 6/2006 | Stewart et al. | |

* cited by examiner

*Primary Examiner* — Etienne Leroux
*Assistant Examiner* — Chelcie Daye
(74) *Attorney, Agent, or Firm* — Marsh Fischmann & Breyfogle LLP; Kent A. Lembke

(57) ABSTRACT

Methods, systems, and articles of manufacture consistent with the present invention provide a model validator that receives a request from a business service application to store data associated with a node in an information model, determines whether the node exists in the information model, and, when it is determined that the node does not exist, generates a new node in the information model based on at least a portion of the data and a current node in the information model. A usage profiler is also provided that monitors access to each node and, in response to the model validator generating a new node, re-ranks each node based on a number of monitored accesses to each node, identifies a weak association between two of the nodes based on the ranking of each of the nodes, and distributes the nodes between two or more memories in accordance with the weak association.

23 Claims, 19 Drawing Sheets

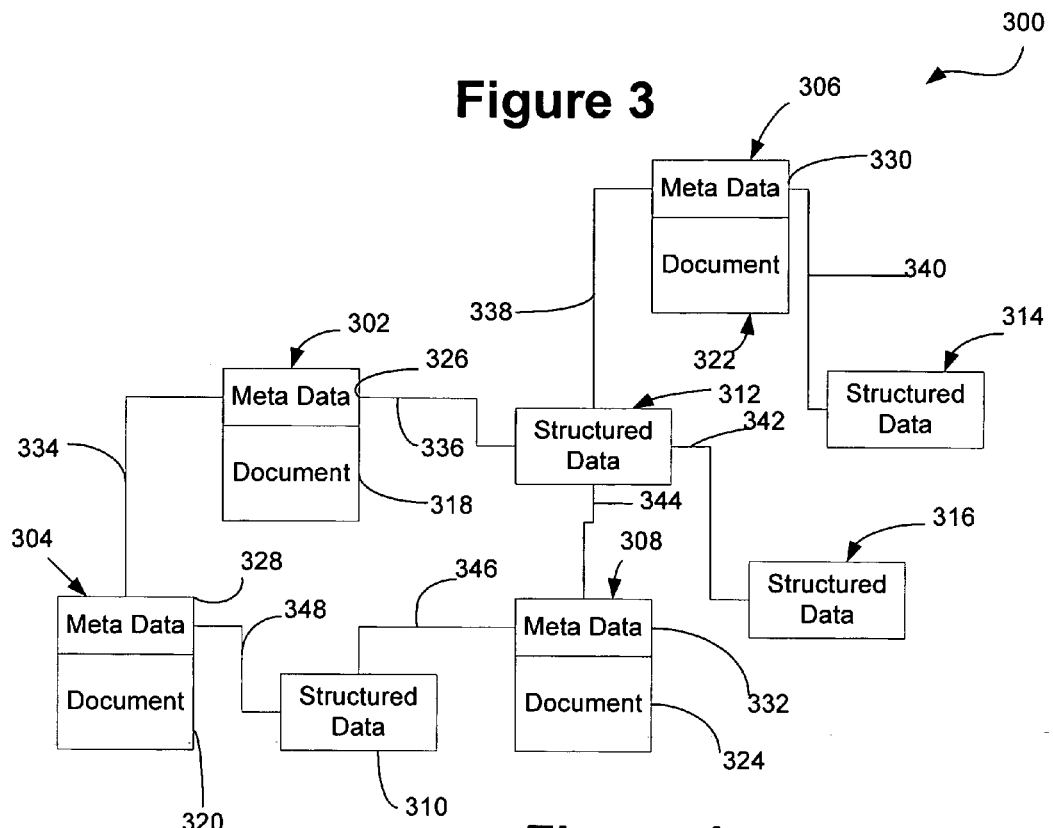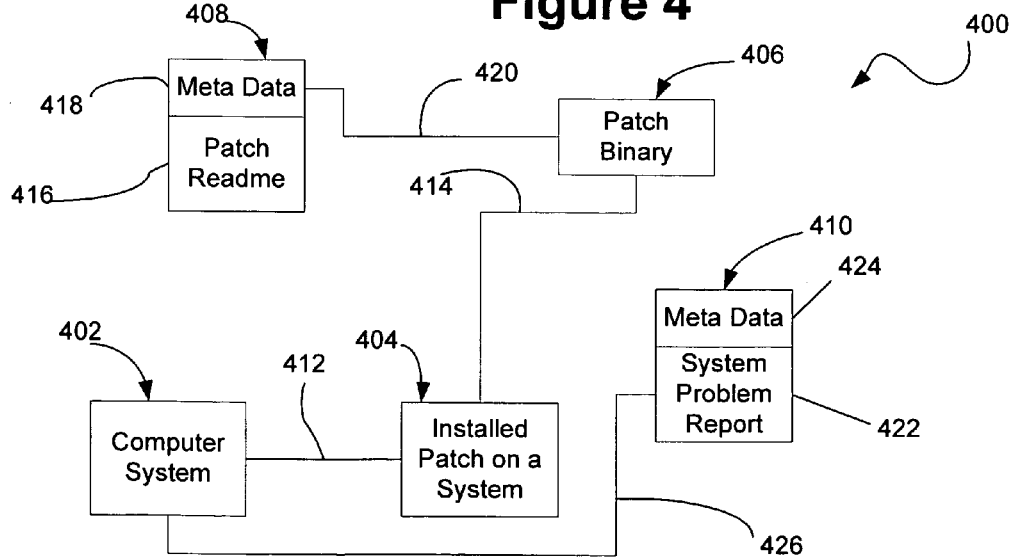

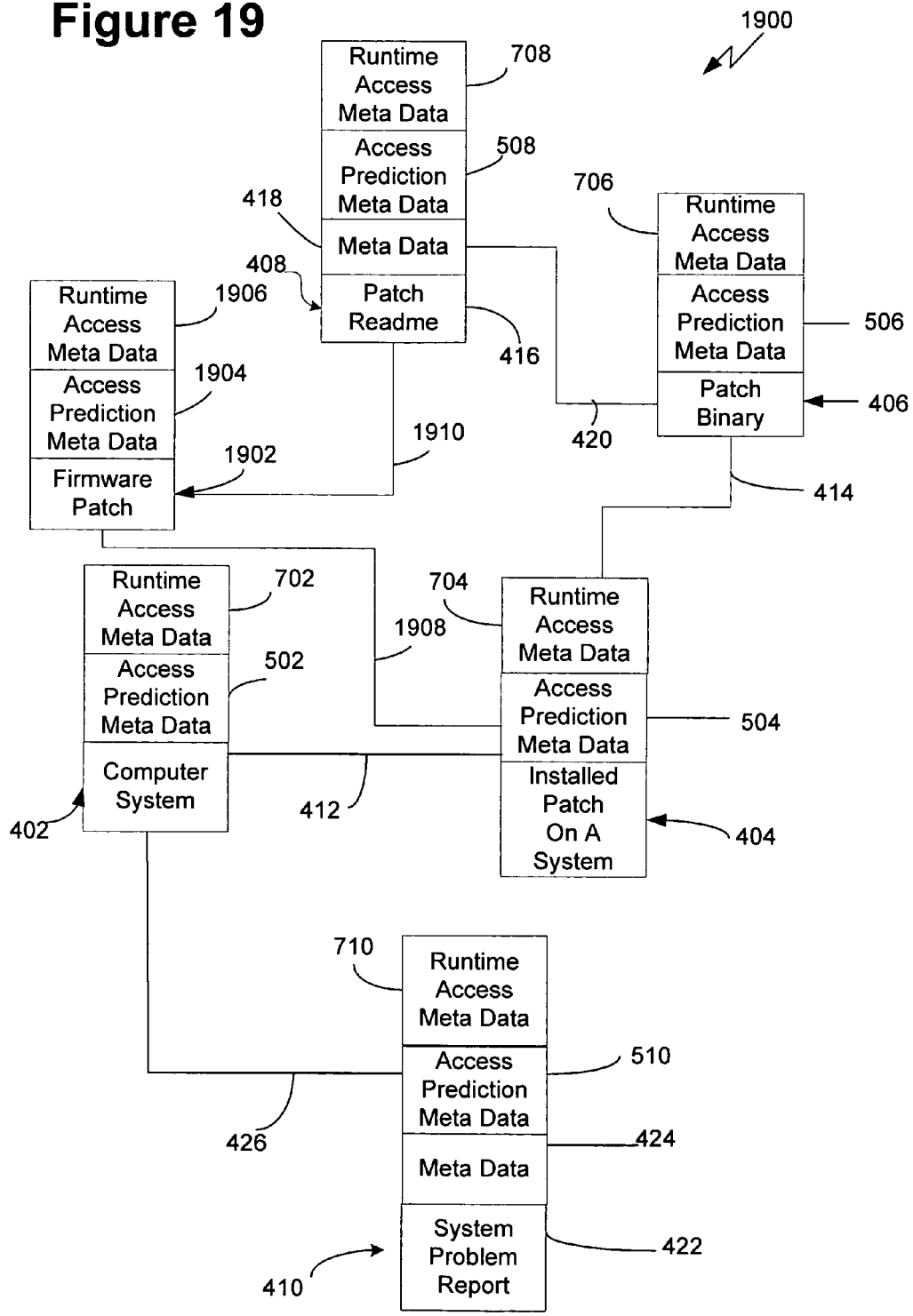

METHODS AND SYSTEMS FOR DISTRIBUTING INFORMATION MODEL NODES IN MEMORY

CROSS-REFERENCE TO RELATED APPLICATIONS

This Application is related to the following U.S. Patent Applications, which are filed concurrently with this Application, and which are incorporated herein by reference to the extent permitted by law:

U.S. Ser. No. 11/080,085, entitled "METHODS AND SYSTEMS FOR CACHING INFORMATION MODEL NODES";

U.S. Ser. No. 11/080,893, entitled "METHODS AND SYSTEMS FOR IDENTIFYING AN ASSOCIATION BETWEEN INFORMATION MODE NODES";

U.S. Ser. No. 11/080,839, entitled "METHODS AND SYSTEMS FOR PERFORMING HIGH-THROUGHPUT INFORMATION REFINEMENT";

U.S. Ser. No. 11/080,894, entitled "METHODS AND SYSTEMS FOR PROVIDING SYNCHRONOUS NOTIFICATION OF INCOMING DATA TO A BUSINESS LOGIC TIER"; and U.S. Ser. No. 11/080,831, entitled "METHODS AND SYSTEMS FOR DYNAMICALLY ALLOCATING INFORMATION REFINEMENT RESOURCES".

FIELD OF THE INVENTION

The present invention relates to methods and systems for managing data for a business service application, and in particular, to methods and systems for dynamically generating a new node in an information model and for distributing information model nodes between memories in a system in accordance with a weak association between two of the information model nodes.

BACKGROUND OF THE INVENTION

Corporations and other enterprises commonly implement their business services on computer systems using a tiered architecture model that provides benefits such as reusability, flexibility, manageability, maintainability, and scalability for a business service application. The tiered architecture model segments an application's components into three tiers of services: the presentation or visualization tier, the middle or business logic tier, and the data or resource tier. These tiers do not necessarily correspond to physical locations on various computers on a network, but rather to logical layers of the application.

The visualization tier or layer provides an interface for the end user into the application. The business logic tier or layer (also referenced as the application layer) typically includes application specific code or components for enforcing a set of business and data rules used to implement a given business service. The resource tier is a data management layer for storing and retrieving information or persistent data usually stored in a database or in permanent storage.

In one implementation of the tiered architecture model, the application layer is operatively connected to the resource layer through information model nodes, which function as an interim translation layer for access to the persistent data that reside in the resource tier. An information model typically describes the combination of a data model (one type of information model node) and a content model (another type of information model node) together with one or more associations between information model nodes. A data model describes the techniques for describing well structured data within an application. For example, the technique or structure for formatting a paragraph in a document created using the Microsoft® Word application may be represented in a data model. A content model is a set of meta data that describes unstructured data, such as data that a user writes in a document described by a given information model. The meta data of the content model may describe associations between the unstructured data as well as information about the unstructured data. For example, the content model for the document created using the Microsoft® Word application may define meta data to include author, date created, data classification (e.g., letter, diagram, spreadsheet, etc.).

One of the problems the information model creates, however, is scalable access from the application layer. For example, a particular business service application may have access to thousands of information model nodes, each of which may have one or more associations to other information model nodes. Thus, a query or request by a user to view data related to one or more information model nodes typically requires significant time using traditional data access techniques, such as read through caching via a relational database management system ("RDBMS"). Furthermore, associations between the information models often lead to cache "bleed." Cache "bleed" occurs when an information model consists of a significant number of nodes and caching two disparate nodes connected by many other associated nodes causes the cache manager to store in cache memory all of the associated nodes in order to retrieve and store the desired two desperate nodes for access by the corresponding business application manager. Since conventional cache memory is a finite size, the cache manager is unable to store (e.g., "bleeds out") other nodes that would be of value to cache for the business service application.

In addition, business service application performance is typically optimized by storing an information model nodes in the same cache memory space or system memory space. However, when the information model is large (e.g., includes thousands of nodes) the information model nodes typically must be stored across multiple cache or system memory spaces on a network, which reduces the performance of the business service application.

Moreover, an information model is typically built or instantiated from a corresponding conceptual model developed by or for a programmer designing the business service application, which will access the instantiated information model. However, after the information model is instantiated and the business service application is running, adding a new node or data class to the conceptual model to accommodate a corresponding change to the business service application requires the programmer or information model administrator to manually modify the information model to ensure the integrity of information model is maintained. However, manually adding a new node or data class to an information model that is already in use may cause operational delays or other performance problems for the business service application.

Therefore, a need has long existed for methods and systems that overcome the problems noted above and others previously experienced.

SUMMARY OF THE INVENTION

Methods, systems, and articles of manufacture consistent with the present invention provide a usage profiler program that improves the performance of a business service application associated with an information model having a plurality of nodes by identifying a weak association between two of the nodes and redistributing the nodes between two or more system memories based on the weak association so that the information model nodes may be collectively managed within the memories. Methods, systems, and articles of manufacture consistent with the present invention also provide a model validator program that automatically extends an information model to include a new node when a business service application attempts to store data associated with a new node class.

In accordance with methods consistent with the present invention, a method in a data processing system is provided. The data processing system has a business service application and a plurality of memories. The method comprises: monitoring access to each of a plurality of information model nodes associated with the business service application, ranking each of the plurality of nodes based on a number of monitored accesses to each node; identifying a weak association between two of the nodes based on the ranking of each of the plurality of information model nodes, and distributing the plurality of nodes between two or more of the plurality of memories in accordance with the weak association.

In accordance with methods consistent with the present invention, another method in a data processing system is provided. The data processing system has a business service application and a plurality of memories. The method comprises: monitoring access to each of a plurality of information model nodes associated with the business service application, ranking each of the plurality of nodes based on a number of monitored accesses to each node, and determining whether a first of the plurality of memories has space to store the two nodes, the first of the two nodes having a higher ranking than the second of the two nodes. The method further comprises: when it is determined that the first of the plurality of memories does not have space to store the two nodes, identifying a weak association between two of the nodes based on the ranking of each of the plurality of information model nodes, and distributing the plurality of nodes between two or more of the plurality of memories in accordance with the weak association.

In accordance with methods consistent with the present invention, another method in a data processing system is provided. The data processing system has a business service application and an information model having a plurality of nodes. The method comprises: receiving a request from the business service application to store data associated with one of the nodes in the information model, determining whether the one node exists in the information model, and when it is determined that the one node does not exist, generating the one node in the information model based on at least a portion of the data.

In accordance with methods consistent with the present invention, another method in a data processing system is provided. The data processing system has a business service application and an information model having a plurality of nodes. The method comprises: receiving a request from the business service application to store data associated with one of the nodes in the information model, and determining whether the one node exists in the information model. The method further comprises: when it is determined that the one node does not exist, identifying a reference in the data, determining whether a current node of the information model nodes has the reference, and when it is determined that the current node has the reference, generating the one node in the information model in accordance with the reference.

In accordance with articles of manufacture consistent with the present invention, a computer-readable medium containing instructions for controlling a data processing system to perform a method is provided. The data processing system has a business service application and a plurality of memories. The method comprising: monitoring access to each of a plurality of information model nodes associated with the business service application; ranking each of the plurality of nodes based on a number of monitored accesses to each node; identifying a weak association between two of the nodes based on the ranking of each of the plurality of information model nodes; and distributing the plurality of nodes between two or more of the plurality of memories in accordance with the weak association.

In accordance with articles of manufacture consistent with the present invention, a computer-readable medium containing instructions for controlling a data processing system to perform a method is provided. The data processing system has a business service application and a plurality of memories. The method comprising: monitoring access to each of a plurality of information model nodes associated with the business service application; ranking each of the plurality of nodes based on a number of monitored accesses to each node; determining whether a first of the plurality of memories has space to store the two nodes, the first of the two nodes having a higher ranking than the second of the two nodes; when it is determined that the first of the plurality of memories does not have space to store the two nodes, identifying a weak association between two of the nodes based on the ranking of each of the plurality of information model nodes; and distributing the plurality of nodes between two or more of the plurality of memories in accordance with the weak association.

In accordance with articles of manufacture consistent with the present invention, a computer-readable medium containing instructions for controlling a data processing system to perform a method is provided. The data processing system has a business service application and an information model having a plurality of nodes. The method comprising: receiving a request from the business service application to store data associated with one of the nodes in the information model; determining whether the one node exists in the information model; and when it is determined that the one node does not exist, generating the one node in the information model based on at least a portion of the data.

In accordance with articles of manufacture consistent with the present invention, a computer-readable medium containing instructions for controlling a data processing system to perform a method is provided. The data processing system has a business service application and an information model having a plurality of nodes. The method comprising: receiving a request from the business service application to store data associated with one of the nodes in the information model; determining whether the one node exists in the information model; and when it is determined that the one node does not exist, identifying a reference in the data; determining whether a current node of the information model nodes has the reference; and when it is determined that the current node has the reference, generating the one node in the information model in accordance with the reference.

In accordance with systems consistent with the present invention, a data processing system is provided. The data processing system comprises a storage having a plurality of information model nodes, and a plurality of memories. At least one of the memories comprises a business service application associated with the information model nodes and a usage profiler program that monitors access to each of a plurality of information model nodes, ranks each of the plurality of nodes based on a number of monitored accesses to each node, identifies a weak association between two of the nodes based on the ranking of each of the plurality of information model nodes, and distributes the plurality of nodes between two or more of the plurality of memories in accordance with the weak association. The data processing system further comprises a processor that runs the usage profiler program.

In accordance with systems consistent with the present invention, a data processing system is provided. The data processing system comprises a storage having a plurality of information model nodes, and a plurality of memories. At least one of the memories comprises a business service application associated with the information model nodes, and a usage profiler program that monitors access to each of a plurality of information model nodes associated with the business service application, ranks each of the plurality of nodes based on a number of monitored accesses to each node, and determines whether a first of the plurality of memories has space to store the two nodes. The first of the two nodes has a higher ranking than the second of the two nodes. The usage profiler program, when it is determined that the first of the plurality of memories does not have space to store the two nodes, further identifies a weak association between two of the nodes based on the ranking of each of the plurality of information model nodes, and distributes the plurality of nodes between two or more of the plurality of memories in accordance with the weak association. The data processing system further comprises a processor that runs the usage profiler program. The data processing system further comprises a processor that runs the usage profiler program.

In accordance with systems consistent with the present invention, a data processing system is provided. The data processing system comprises a storage having a plurality of information model nodes and a memory. The memory comprises a business service application associated with the information model nodes, and a model validator program that receives a request from the business service application to store data associated with one of the information model nodes, determines whether the one node exists in the information model, and when it is determined that the one node does not exist, generates the one node in the information model based on at least a portion of the data. The data processing system further comprises a processor that runs the model validator program.

In accordance with systems consistent with the present invention, a data processing system is provided. The data processing system comprises a memory. The memory comprises a business service application, an information model having a plurality of nodes, and a model validator program. The model validator program receives a request from the business service application to store data associated with one of the nodes in the information model, determines whether the one node exists in the information model, and when it is determined that the one node does not exist, identifies a reference in the data, determines whether a current node of the information model nodes has the reference, and when it is determined that the current node has the reference, generates the one node in the information model in accordance with the reference. The data processing system further comprises a processor that runs the model validator program.

In accordance with systems consistent with the present invention, a system is provided that includes means for monitoring access to each of a plurality of information model nodes associated with the business service application, means for ranking each of the plurality of nodes based on a number of monitored accesses to each node, means for identifying a weak association between two of the nodes based on the ranking of each of the plurality of information model nodes, and means for distributing the plurality of nodes between two or more of the plurality of memories in accordance with the weak association.

In accordance with systems consistent with the present invention, a system is provided that includes means for receiving a request from a business service application to store data associated with a node in an information model, means for determining whether the node exists in the information model, and means for, when it is determined that the node does not exist, generating a new node in the information model based on at least a portion of the data.

The above-mentioned and other features, utilities, and advantages of the invention will become apparent from the following detailed description of the preferred embodiments of the invention together with the accompanying drawings.

Other systems, methods, features, and advantages of the invention will become apparent to one having skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 3 depicts a block diagram of an exemplary information model having nodes that may be accessed by a business service application of the data processing system;

FIG. 4 depicts a block diagram of another exemplary infrastructure of information model nodes that may be accessed by the business service application of the data processing system;

FIG. 19 depicts the information model illustrated in FIG. 4 modified by the model validator to include a new node in accordance with methods consistent with the present invention.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

Figure 1:
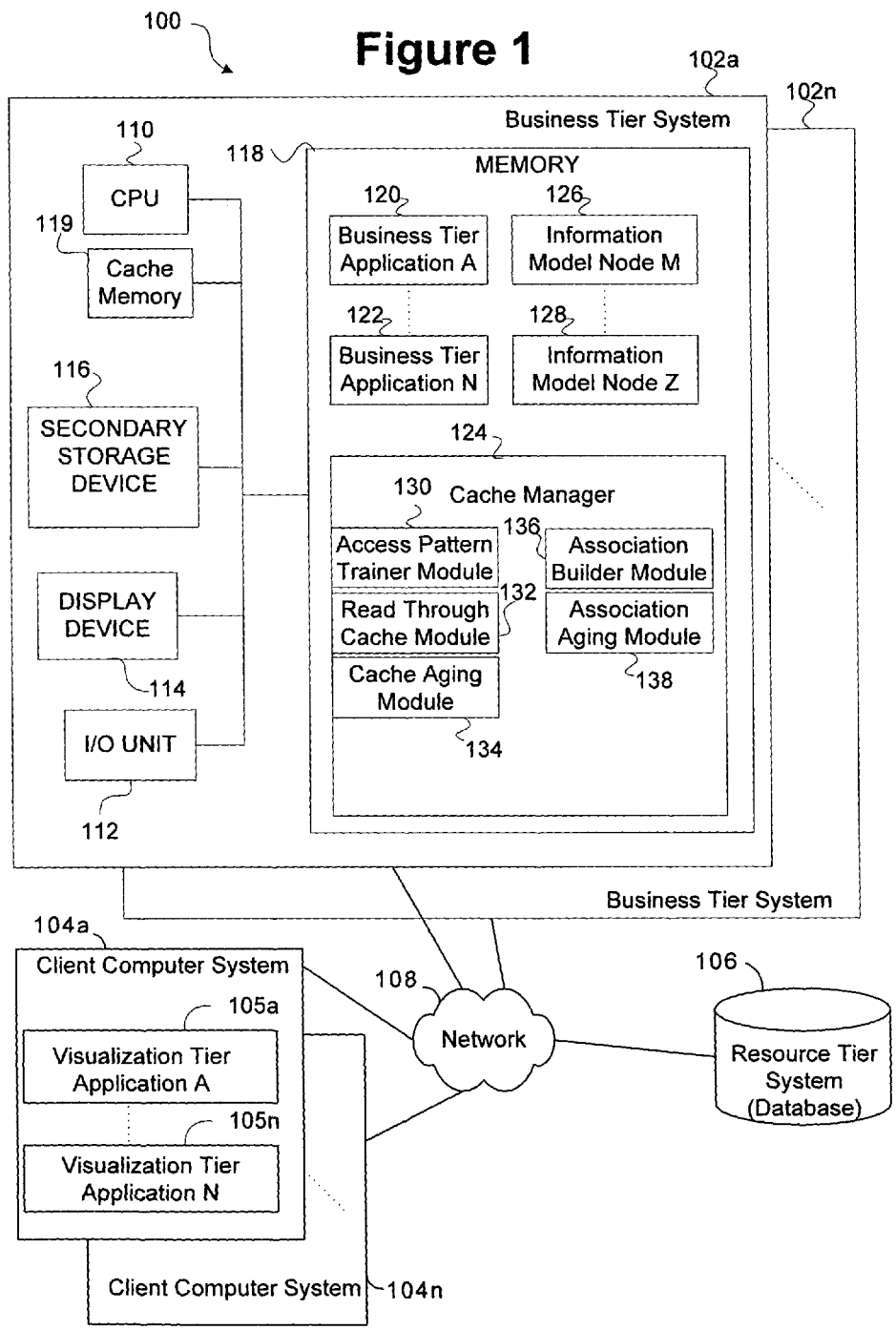
FIG. 1 depicts an exemplary block diagram of a data processing system in accordance with methods and systems consistent with the present invention.
Figure 2:
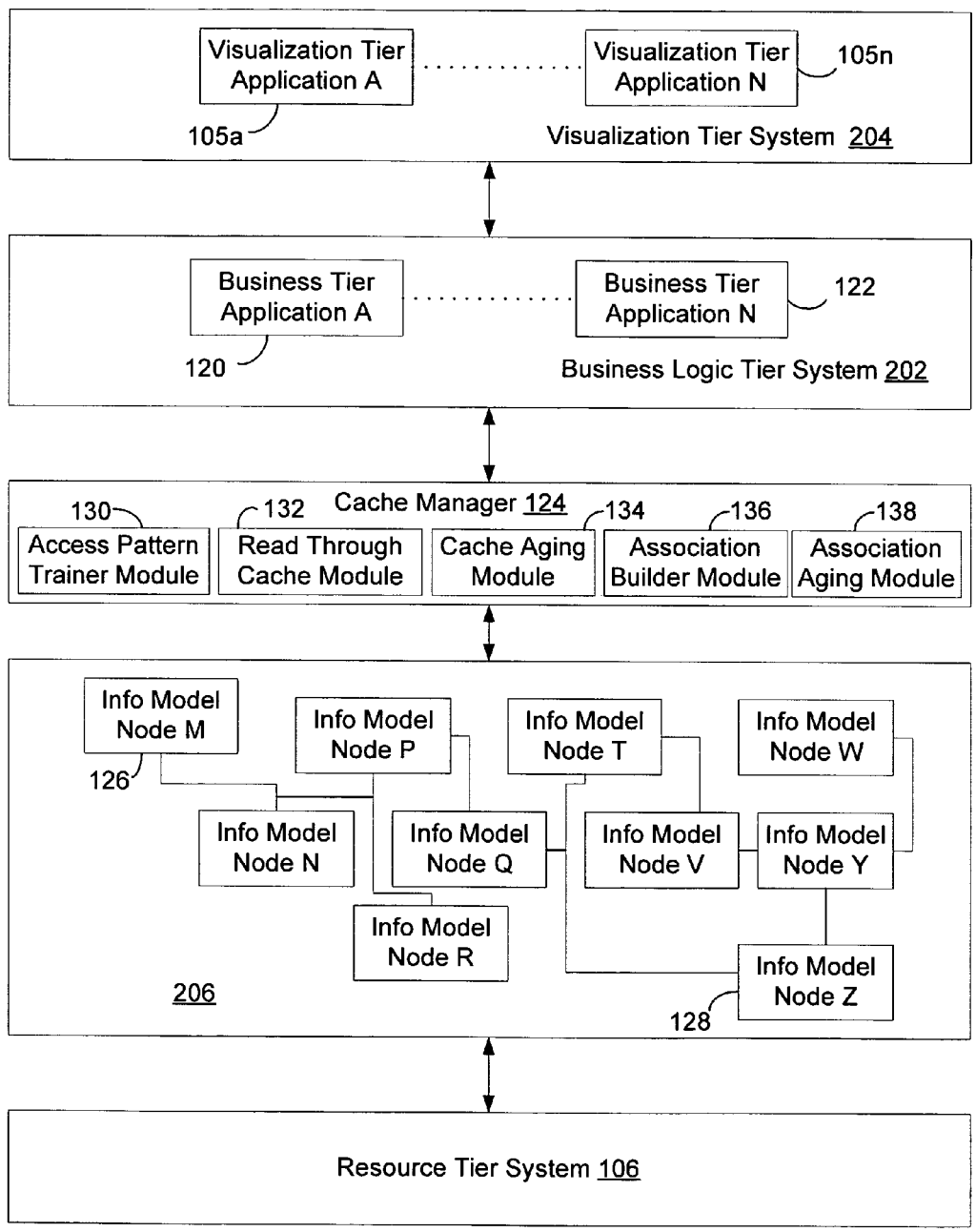
FIG. 2 depicts an exemplary functional block diagram of the data processing system.

FIG. 1 depicts an exemplary block diagram of a data processing system 100 suitable for use with methods and systems consistent with the present invention. FIG. 2 depicts an exemplary functional block diagram of the data processing system 100. Data processing system 100 is referred to hereinafter as "the system." The system 100 has a tiered architecture for implementing and managing one or more business service applications of an enterprise. The system 100 comprises one or more business tier systems 102a-102n (shown functionally as business tier system 202 in FIG. 2), one or more client computer systems 104a-104n that collectively function as a visualization tier system 204 in FIG. 2, and a resource tier system 106. Each business tier system 102a-102n is operatively connected to each client computer system 104a-104n and to the resource tier system 106 across a network 108. The network 108 may be any known private or public communication network, such as a local area network ("LAN"), WAN, Peer-to-Peer, or the Internet, using standard communications protocols. The network 108 may include hardwired as well as wireless branches.

The business tier system 102 may be a Sun® SPARC® data processing system running the Solaris® operating system. One having skill in the art will appreciate that devices and programs other than those described in the illustrative examples can be implemented. Sun, Java, and Solaris are trademarks or registered trademarks of Sun Microsystems, Inc., Palo Alto, Calif., in the United States and other countries. SPARC is a registered trademark of SPARC International, Inc., in the United States and other countries. Other names may be trademarks or registered trademarks of their respective owners. The business tier system 102 comprises a central processing unit ("CPU") 110, an input/output ("I/O") unit 112, a display device 114, a secondary storage device 116, a memory 118, and a cache memory 119. The business tier system 102 may further comprise standard input devices such as a keyboard, a mouse or a speech processing means (each not illustrated).

Client computer systems 104a-104n each comprise similar components to those of the services system, such as a CPU, a memory, an I/O unit, a display device, and a secondary storage device. In one implementation, each client computer system 104a-104n may be any general-purpose computer system such as an IBM compatible, Apple, or other equivalent computer.

Memory 118 of each business tier system 102a-102n comprises one or more business tier applications 120 and 122 (also referenced as "business service applications") that are operatively configured to receive data from or transmit data to visualization tier applications 105a-105n operating on client computer systems 104a-104n. For example, visualization tier application "A" 105a may be a browser program for interfacing to the business tier application "A" 120, which may be a web server application for a product fault reporting and identification service for an enterprise implementing the system 100. Alternatively, visualization tier application "N" 105n may be a user interface for accessing a document editor and maintenance service program (e.g., business service application "N" 122), such as Docs Open® commercially available from Hummingbird Ltd.

Memory 118 also includes a cache manager 124 and one or more information model nodes 126 and 128 that are operatively configured to connect a respective business service application 114 or 116 to related persistent data, which may reside in the resource tier system 106. As shown in FIG. 2, the cache manager 124 facilitates access to one or more of the information model nodes 126 and 128 that are responsive to a query or request from a business service application 114 or 116 consistent with methods and systems of the present invention. In one implementation, the information model nodes 126 and 128 function as an interim translation layer 206 for access to corresponding persistent data that may reside in or be read from the resource tier system 106. As discussed in further detail below, one or more of the nodes 126 and 128 in the information model may be initially read from the resource tier system 106 into memory 118 or cache memory 119 to improve the time for responding to a query from a business service application 120 or 122.

The cache manager 124 has an "access pattern trainer module" 130 that is operatively configured to monitor access to an information model node associated with a business service application and generate an access pattern for the information model node based on a number of accesses to the information model node, and store the access pattern in association with the information model. Upon receiving a query or request from the business service application, the cache manager 124 is operatively configured to determine whether an information model is responsive to the request based on the access pattern of the respective information model node.

The cache manager 124 may also have a "read through cache module" 132 that enables data written to or read from the system memory 118 to be read through cache memory 119. Thus, when reading data from the resource tier system 106 to memory 118, the cache manager 124 is able to direct data read from memory 118 (e.g., query data from a business service application 120 or 122) or data read from resource tier system 106 (e.g., persistent data associated with an information model node 126 or 128) to also be read by the access pattern trainer module 130.

In one implementation, the cache manager 124 stores in cache memory 119 the information model nodes 126 and 128 that have been frequently used in response to a business service application query or request. As discussed in further detail below, the cache manager 124 may use the access pattern associated with the information nodes 126 and 128 stored in the cache memory 119 to predict or identify a responsive information model node for a next query or request received from a respective business service application. In this implementation, the cache manager 124 may include a cache aging module that is operatively configured to determine whether an information model node 126 or 128 stored in the cache memory 119 has been accessed within a predetermined period and deleting the respective information model node from the cache memory 119 in response to determining that the node has not been accessed within the predetermined period.

One having skill in the art will appreciate that the cache manager 124 and the functional modules 130, 132, and 134 may each be a stand-alone program residing in memory on a data processing system other than a business tier system 102a-102n. The cache manager 124 and modules 130, 132, and 134 may each comprise or may be included in one or more code sections containing instructions for performing their respective operations. While the cache manager 124 and modules 130, 132, and 134 are described as being implemented as software, the present implementation may be implemented as a combination of hardware and software or hardware alone. Also, one having skill in the art will appreciate that the cache manager 124 and modules 130, 132, and 134 may comprise or may be included in a data processing device, which may be a client or a server, communicating with each business tier system 102a-102n.

The resource tier system 106 may be a database accessible by the cache manager 124 via a standard RDBMS (not shown in figures). Alternatively, the resource tier system 106 may be a file server accessible by the cache manager 124, for example, via a Lightweight Directory Access Protocol ("LDAP"—not shown in figures).

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of the data processing system 100 have been described, one skilled in the art will appreciate that a data processing system suitable for use with methods, systems, and articles of manufacture consistent with the present invention may contain additional or different components.

FIG. 3 depicts an exemplary infrastructure 300 of information model nodes 302 . . . 316 that may be designed for and accessed by a business service application 120 or 122 of the system 100. The information model nodes 302 . . . 316 may be a portion of the information model nodes 126 and 128 maintained by a respective business tier system 102a or 102n. As shown in FIG. 3, the information model nodes 302 . . . 316 may comprise content models 302 . . . 308 and data models 310 . . . 316. Each of the content models 302 . . . 308 includes respective unstructured data (e.g., a document or portion thereof) 318, 320, 322, and 324, and meta data 326, 328, 330, and 332 that describes the respective unstructured data. Each meta data 326, 328, 330, and 332 may include one or more data elements that identify characteristics of the unstructured data specified at the time the unstructured data was designed or created. For example, meta data 326, 328, 330, and 332 may each have data elements that identify an author, a creation date, and average size of the respective unstructured data 318, 320, 322, and 324.

Each of the data models 310 . . . 316 describes structured data relevant to a business service application 120 or 122. The data models 310 . . . 316 may be preexisting data models defined at the time the business service application 120 or 122 was designed or used. Each of the information model nodes has one or more static associations 334, 336, 338, 340, 342, 344, 346, and 348 each of which identifies a relationship to another node. Each of the static associations 334, 336, 338, 340, 342, 344, 346, and 348 may be a pointer or index to the other node.

In the illustrative example shown in FIG. 4, the infrastructure 400 of information model nodes 402 . . . 410 are designed for a business service application 120 that corresponds to a computer system fault reporting and identification service. The information model 400 for the computer system fault reporting and identification service may contain hundreds or thousands of nodes. However, for clarity in the description, only information model nodes 402 . . . 410 are illustrated. In this example, the information model node 402 corresponds to structured data that describes elements of a computer system serviced by the business service application 120. Table 1 below identifies an illustrative format of the structured data for the information model node 402 to describe a computer system.

TABLE 1

| Category | Element Name | Sub Element Name | Description | Data Type with delimiter (e.g., ";") to separate multiple entries |
| --- | --- | --- | --- | --- |
| Hardware | Computer System | | Model number and configuration version for the computer system | String delimiter string |
| | | Motherboard | Model number of motherboard version in the computer system | String |

TABLE 1-continued

| Category | Element Name | Sub Element Name | Description | Data Type with delimiter (e.g., ";") to separate multiple entries |
|---|---|---|---|---|
| | | CPU | Model numbers of compatible CPU | String |
| | | RAM | Type and size of compatible random access memory. | String |
| | Video card | | Model numbers of compatible video card | String |
| | Modem | | Model numbers of compatible modem | String |
| | Hard drive controller | | Model numbers of compatible hard drive controller | String |
| | Hard drive | | Model numbers of compatible hard drive | String |
| | CD/DVD controller | | Model numbers of compatible controllers | String |
| | Display | | Model numbers of compatible displays | String |
| Software | Motherboard Firmware | | Filename/version | String delimiter string |
| | Operating System (OS) | | Filename/version | String delimiter string |

The information model node 404 corresponds to structured data that identifies that a patch has been created for and should be installed on the computer system described by information model node 402. The patch information model node 404 may include data elements that identify the patch (e.g., a patch filename, version number, a creation date, size, and author), the operating system name for installing the patch, and the computer system name in which the operating system is installed (e.g., an "applies to hardware" reference to "computer system" node 402. Thus, a static data association 412 between nodes 402 and 404 may be identified when the information model node 404 is designed or created based on the operating system name or computer system name identified by both nodes 402 and 404. In one implementation, a data association may be reflected by a pointer to the related node. Thus, information model node 402 may have a pointer to information model node 404, and vice versa, to reflect the data association 412 between the two nodes.

Continuing with the example shown in FIG. 4, the information model node 406 corresponds to structured data that describes the patch identified by the information model node 404 and has an association 414 based on the patch filename identified by both nodes 404 and 406. The information model node 408 corresponds to a content model that has unstructured data (e.g., the "patch readme" document 416) written, for example, by the author of the patch to identify what fault the patch corrects and how to install the patch on the computer system identified by information model node 402. The information model node 408 also has meta data 418 that may identify the patch filename, a version number, the author of the document 416, and the date that the document 416 was created. Thus, when the information model node 408 is designed or created, an association 420 may be generated to reflect a relationship between the two nodes 406 and 408 based on a common data element, such as patch filename or patch author.

In the example shown in FIG. 4, the information model node 410 is a content model that has unstructured data (e.g., "system problem report" document 422) written, for example, by a customer reporting a problem or fault with a computer system as described by the information model node 402. The information model node 410 also has meta data 424 that identifies, for example, the customer that authored the report, a creation date, fault error as reported by the user's computer 104*a* and the name of the computer system having the fault. In accordance with systems and methods consistent with the present invention, the customer may report a problem to the business service application 120 via a respective visualization tier application 105*a* on one of the client computer systems 104*a*-104*n*. The business service application 120 then generates and stores the information model node 410 on the resource tier system 106. In the implementation shown in FIG. 4, the information model node 410 (e.g., "system problem report" document 422) is initially designed to have a static association 426 with the information model node 402 ("computer system") to reflect a relationship between the two nodes 410 and 402 based on a common data element, such as computer system name. The designer of the information model depicted in FIG. 4 may have designed the information model nodes 402 and 410 and the association 426 before revising the information model to incorporate nodes 406 and 408 for handling a "patch" to, for example, the "operating system" software for the computer system identified by the instantiation of the information model node 402. Thus, the designer of information model node 410 may not have foreseen what types of problems are associated with the computer system 402 that a customer may need to report and what corresponding corrections would be developed and made available.

To identify a correction for the reported fault identified in the "system problem report" document 422, the business service application 120 may query the information model infrastructure 400 via cache manager 124. In response to the query, the cache manager 124 may retrieve information model nodes 410, 402, 404, 406, and 408 in order based on associations 426, 412, 414, and 420 to determine that the fault identified in the system problem report of node 410 is the same as the fault identified in the "patch readme" document 416 of node 408. The access pattern trainer module 130 is able to monitor each access to the information model nodes 410, 402, 404, 406, and 408 to generate an access pattern for each node so that the cache manager 124 is able to receive a subsequent query associated with one node (e.g., another "system problem report" node 410) and identify a responsive information node (e.g., node 408) based on the access pattern of the one node. As described in further detail below, the cache manager 124 is able to recognize or predict that the "patch readme" document 416 of information node 408 is responsive to a subsequent query from the business service application (e.g., from another customer having a computer system depicted by node 402) based on the access pattern associated with the node 410 by the cache manager 124.

Figure 5:
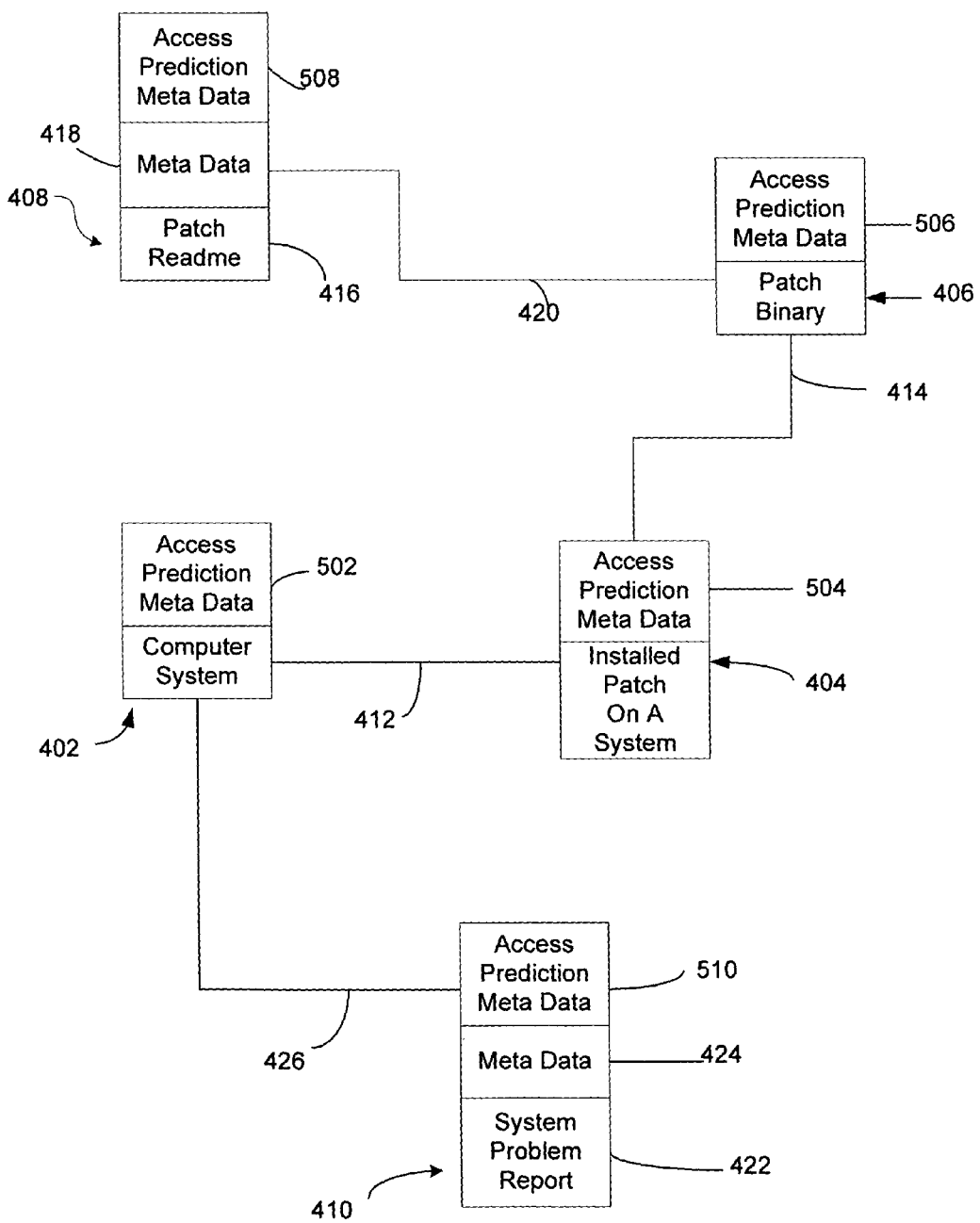
FIG. 5 depicts the information model nodes shown in FIG. 4 modified to each include access prediction meta data in accordance with methods and systems consistent with the present invention.

FIG. 5 depicts the information model nodes 402 . . . 410 modified to each include respective access prediction meta data in accordance with methods and systems consistent with the present invention. In the implementation shown in FIG. 5, a designer of each information model node 402 . . . 410 identifies access prediction meta data 502 . . . 510 for the respective node 402 . . . 410. Each access prediction meta data 502 . . . 510 includes one or more not-deterministic elements that represent hints for the cache manager 124 to use in determining which of the information model nodes 402 . . . 410 should be stored in the cache memory 119 so that a response to an anticipated query from the respective business service application 120 may be generated more quickly than accessing the information model nodes 402 . . . 410 from persistent data storage in the resource tier system 106. For example, each access prediction meta data 502 . . . 510 may include an expected average size of the structured or unstructured data associated with the information model node 402 . . . 410. The expected average size is non-deterministic because the designer does not know (at the time the node 402 . . . 410 is designed) the actual average size, for example, of each "patch readme" document 416 that may be generated and associated with a "patch binary" 406 based on the information model nodes 406 and 408 conceptualized by the designer. The cache manager 124 may use the expected average size provided in the access prediction meta data of the respective node 402 . . . 410 to determine whether the node 402 . . . 410 should be stored in the cache memory 119 in lieu of another node 402 . . . 410 having a different expected average size.

Each access prediction meta data 502 . . . 510 may also include other non-deterministic elements, such as an expected access number that reflects how frequently the respective information model node 402 . . . 410 will be accessed in response to one or more queries from the business service application 120 associated with the information model nodes 402 . . . 410. In one implementation, the cache manager 124 assigns a rank to each node 402 . . . 410 based on the expected access number provided in the access prediction meta data 502 . . . 510. If all nodes 402 . . . 410 cannot be stored in cache memory 119, the cache manager 124 may store the nodes 402 . . . 410 in cache memory 119 based on the rank assigned to each node 402 . . . 410.

However, the business service applications 120 and 122 may be modified or changed over time or replaced with new business service applications that attempt to reuse the information model nodes 402 . . . 410. In this implementation, the non-deterministic elements provided in the access prediction meta data 502 . . . 510 associated with each information model node 402 . . . 410 may no longer reflect how the information model nodes 402 . . . 410 are being used by the respective business service application 120 and 122. Accordingly, the cache manager 124 may improve the time to respond to a query from the business service application 120 and 122 by deriving an access pattern for one or more nodes 402 . . . 410 in the information model in accordance with methods consistent with the present invention.

Figure 6:
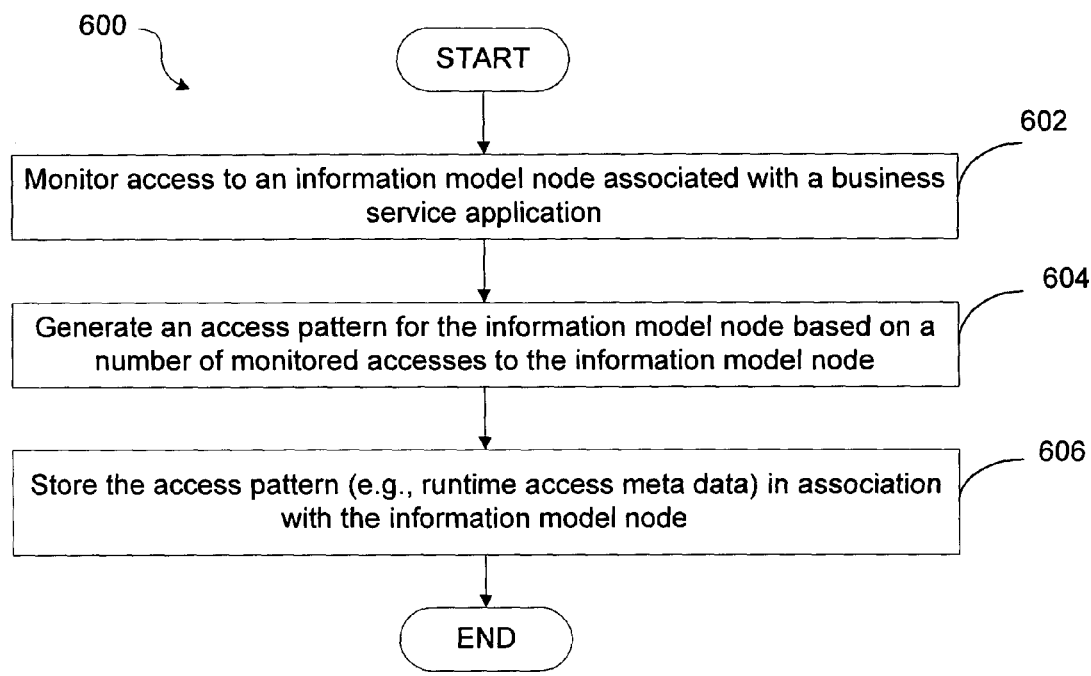
FIG. 6 depicts a flow diagram illustrating an exemplary process performed by a cache manager of the data processing system to identify an access pattern for an information model node associated with the business service application.

FIG. 6 depicts a flow diagram illustrating an exemplary process 600 performed by the cache manager 124 to identify an access pattern for an information model node associated with a business service application 120 and 122. Initially, the cache manager 124 monitors access to an information model node associated with a business service application (step 602). Continuing with the example information model depicted in FIG. 4, the cache manager 124 is able to monitor access to each of the information model nodes 402 . . . 410 associated with the business service application 120. The cache manager 124 may monitor access to the information model nodes 402 . . . 410 by evaluating each information model node 402 . . . 410 that is read into system memory 118, via "read through cache module" 132, from the resource tier 106 in response to a query or request from the business service application 120 to access data or a data element (e.g., "computer system name" in Table 1) associated with one or more of the information model nodes 402 . . . 410. For example, as discussed above, to identify a correction for the reported fault identified in the "system problem report" document 422, the business service application 120 may query or request data from the information model infrastructure 400 via cache manager 124. In response to the query or request, the cache manager 124 may retrieve information model nodes 410, 402, 404, 406, and 408 in order based on associations 426, 412, 414, and 420 to determine that the fault identified in the system problem report of node 410 is the same as the fault identified in the "patch readme" document of node 416. In this example, the cache manager 124 is able to monitor or evaluate each information model node 410, 402, 404, and 408 based on the query or request from the business service manager 120 to identify a correction for the reported fault identified in the "system problem report" document 422.

Figure 7:
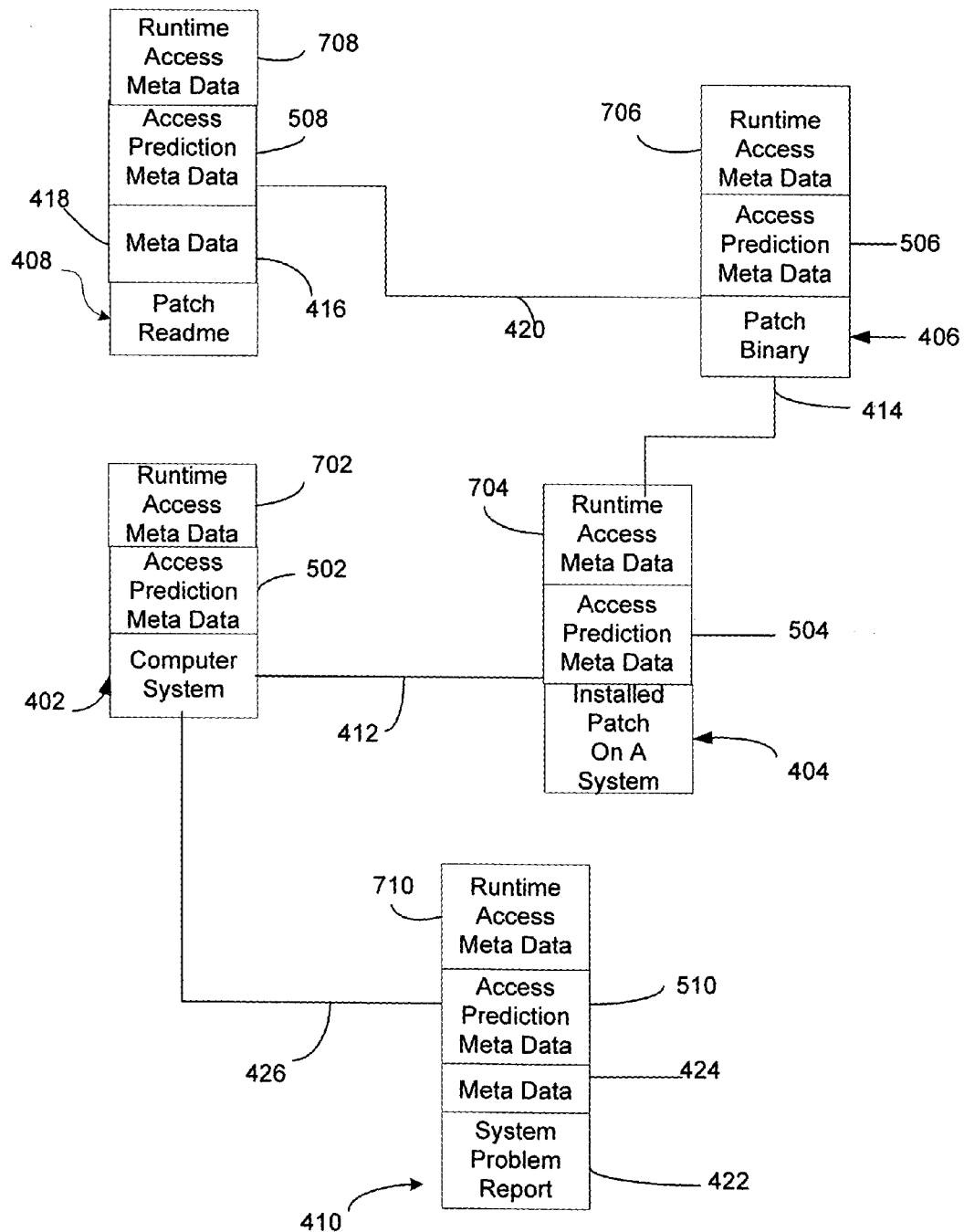
FIG. 7 depicts the information model shown in FIG. 4 modified by the cache manager so that at least one information model node includes an access pattern having runtime access meta data.

Next, the cache manager 124 generates or updates an access pattern for the information model node based on a number of monitored accesses to the information model node (step 604). For example, when the cache manager 124 retrieves each of the information model nodes 402 . . . 410 in response to the business service application's 120 query or request for a correction for the reported fault identified in the "system problem report" document 422, the cache manager 124 is able to determine whether the monitored node (e.g., node 410) has an access pattern. If the monitored node does not have an access pattern, the cache manager 124 generates a new access pattern by creating runtime access meta data for the node 402 . . . 410 and initializes an access number in the access pattern. FIG. 7 depicts the information model nodes 402 . . . 410 as modified by the cache manager 124 to store a respective access pattern having runtime access meta data 702 . . . 710 in association with each node 402 . . . 410. The next time the node 402 . . . 410 is read by the cache manager 124 in response to another query from the business service application 120, the cache manager 124 updates the access pattern of the node by, for example, incrementing the access number stored in the runtime access meta data 702 . . . 710 associated with the respective node 402 . . . 410. In one implementation, the cache manager 124 also stores, as part of the access pattern for the node 402 . . . 410, a date when the access the access number in the runtime access meta data 702 . . . 710 associated with the node was last updated. The cache manager 124 may use the date and the access number stored in the access pattern of a node 402 . . . 410 to determine whether the node 402 . . . 410 should be stored in cache memory 119 as discussed below.

The cache manager 124 then stores the access pattern (e.g., the runtime access meta data 702, 704, 706, 708, or 710) in association with the information model node 410, 402, 404, 406, or 408 (step 606). The cache manager 124 may store the access pattern with the information model node on the resource tier 106 or in secondary storage 116. The cache manager 124 may then use the access pattern of each node 402 . . . 410 to determine whether the node 402 . . . 410 should be stored in cache memory 119 to facilitate a more rapid response to a subsequent query from the business service application 120.

Figure 8:
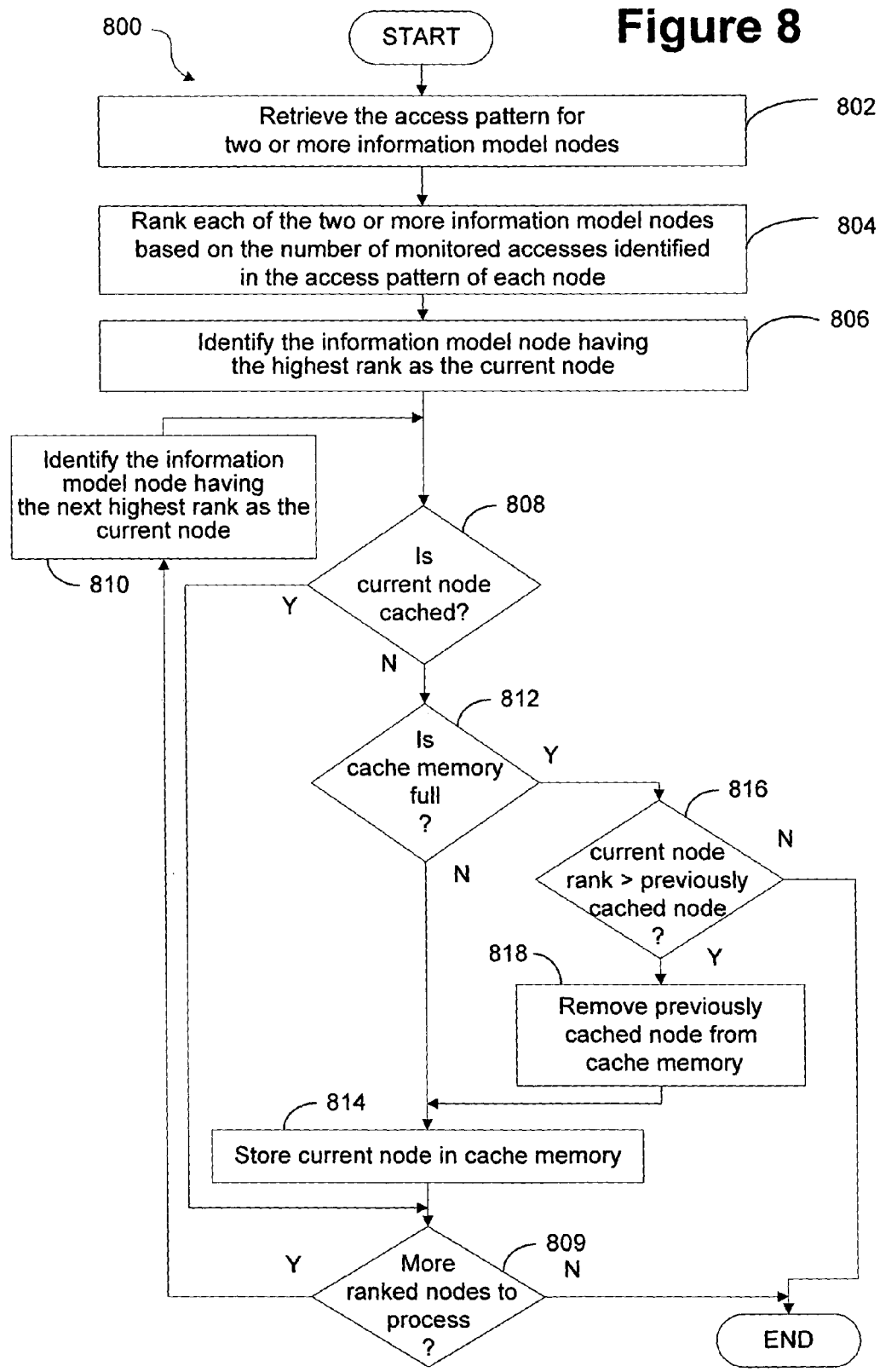
FIG. 8 depicts a flow diagram illustrating another exemplary process performed by the cache manager to identify an information model node to be stored in cache memory based on the access pattern associated with the information model node.

FIG. 8 depicts a flow diagram illustrating another exemplary process 800 performed by the cache manager 124 to identify an information model node to be stored in cache memory 119 based on the access pattern associated with the information model node. Initially, the cache manager 124 retrieves the access pattern for two or more information model nodes 402 . . . 410 (step 802). In the implementation shown in FIG. 7, the cache manager 124 may retrieve the access pattern of each node 402 . . . 410 by retrieving the runtime access meta data 702 . . . 710 previously stored by the cache manager 124 in association with the respective node 402 . . . 410. In one implementation, the cache manager 124 is able to recognize whether an information model node 402 . . . 410 was previously cached or stored in cache memory 119 and includes the previously stored cached node in the two or more information model nodes 402 . . . 410 in the process 600.

The cache manager 124 then ranks each of the two or more information model nodes 402 . . . 410 based on the number of monitored accesses (i.e., the access number) identified in the access pattern of each node (step 804). Assuming multiple customers that own or operate a computer system identified by information model node 402, a significant portion of the customers may have reported within a predefined period (e.g., last month) a fault to the business service application 120 (e.g., the product fault reporting and identification service for enterprise) to cause the business service application 120 to query the information model infrastructure 700 as modified by the cache manager 124 to identify a correction to the reported fault. Accordingly, each of the nodes 402 . . . 410 may have an access number that is significantly higher than other nodes (not shown in FIG. 7) of the same information model for the predetermined period. As a result, nodes 402 . . . 410 may have a higher ranking than other nodes in the same information model for the predetermined period.

After ranking the two or more information model nodes 402 . . . 410, the cache manager 124 identifies the information model node having the highest rank (e.g., node 402) as the current node (step 806). The cache manager 124 then determines whether the current node 402 is already cached or stored in cache memory 119 (step 808). If the current node is already cached, the cache manager 124 then determines whether there are more ranked nodes to process (step 809). If there are more ranked nodes, the cache manager 124 then identifies the information model node having the next highest rank (e.g., node 406) as the current node (step 810) and continues processing at step 808.

If the current node is not already cached, the cache manager 124 then determines whether the cache memory 119 is full (step 812). If the cache memory 119 is not full, the cache manager 124 stores the current node in cache memory 119 (step 814) and continues processing at step 809.

If the cache memory 119 is full, the cache manager 124 determines whether the current node has a higher rank than a previously cached node (step 816). If the current node has a higher rank than the previously cached node, the cache manager 124 removes the previously cached node from cache memory 119 (step 818) and continuing processing at step 814 to store the current node in cache memory 119. If the current node does not have a higher rank than the previously cached node or if there are no more ranked nodes, the cache manager 124 ends processing.

Figure 9:
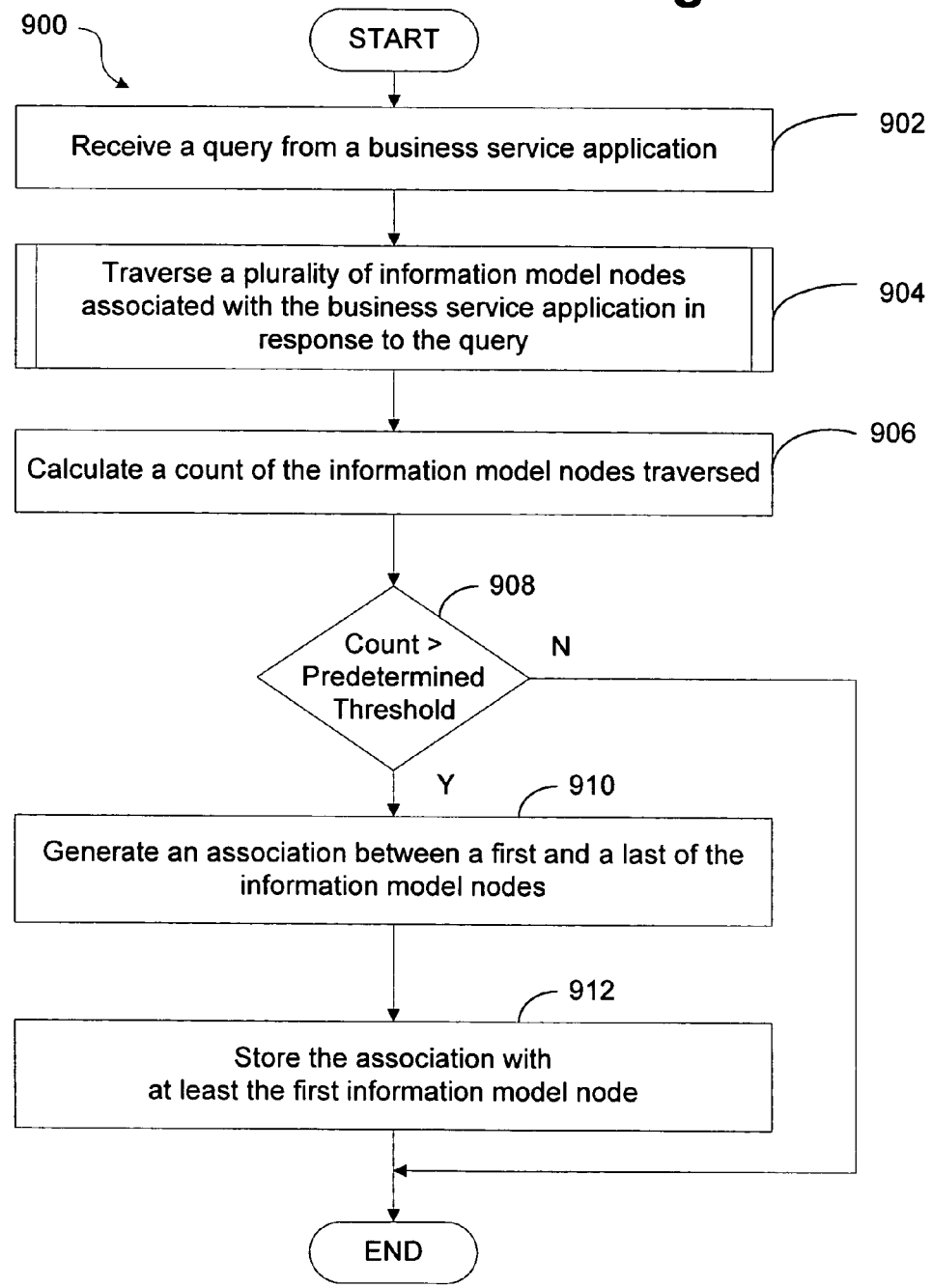
FIG. 9 depicts a flow diagram illustrating another exemplary process performed by the cache manager to generate an association between information model nodes associated with a business service application.

FIG. 9 depicts a flow diagram illustrating another exemplary process 900 performed by the cache manager 124 to generate an association between information model nodes associated with a business service application. Initially, the cache manager 124 receives a query from a business service application (step 902). The business service application 120 or 122 may generate a query based on a corresponding request from a user on client computer system 104a or 104n. For example, as described above, the business service application 120 may be an application for a product fault reporting and identification service of an enterprise implementing the system 100. In this example, the business service application 120 may receive a problem report from a user via the visualization tier application 105a on the client computer system 104a, where the problem report is generated consistent with information model node 410 in FIG. 4 for a "system problem report" document 422 in accordance with the present invention. To identify a correction for the reported fault identified in the "system problem report" document 422, the business service application 120 may query the information model infrastructure 400 via cache manager 124.

The cache manager 124 then traverses a plurality of information model nodes associated with the business service application in response to the query (step 904). Continuing with the example shown in FIG. 4, in response to the query, the cache manager 124 may traverse information model nodes 410, 402, 404, 406, and 408 in order based on associations 426, 412, 414, and 420 to determine that the fault identified in the system problem report of node 410 is the same as the fault identified in the "patch readme" document of node 416. In this example, the cache manager 124 is able to monitor or evaluate each information model node 410, 402, 404, 406, and 408 based on the query or request from the business service manager 120 to identify a correction for the reported fault identified in the "system problem report" document 422. As further explained below, the cache manager 124 may traverse each information model node 410, 402, 404, 406, and 408 by accessing each information model node within the resource tier system 106 and determining whether the respective node is responsive to the query from the business service application 120. Alternatively, the cache manager 124 may traverse the nodes 410, 402, 404, 406, and 408 by accessing the runtime access meta data 710, 702, 704, 706, and 708 of the respective node to determine whether the respective node is responsive to the query from the business service application 120. In the example shown in FIGS. 4 and 7, the node 402 . . . 410 currently being traversed by the cache manager 124 may be responsive to the problem fault query if the node has data identifying an associated correction, such as the node 408 that has the "patch readme" document 416. Runtime access meta data 708 may have a data element, such as "system fault error corrected" (e.g., second data element that is related to the first data element of the first node 410) that may be reported by a user's computer 104a and that is further identified in the "patch readme" document of node 416. Thus, the cache manager may end traversing the information model nodes 410, 402, 404, 406, and 408 when a last node 408 responsive to the query is identified.

After or while traversing the plurality of information model nodes 410, 402, 404, 406, and 408, the cache manager 124 calculates a count of the information model nodes traversed (step 906). In the example shown in FIGS. 4 and 7, the cache manager 124 is able to determine that the count is five for the number of information model nodes traversed in response to the query from the business service application 120 before the last responsive node 416 is identified.

Figure 10:
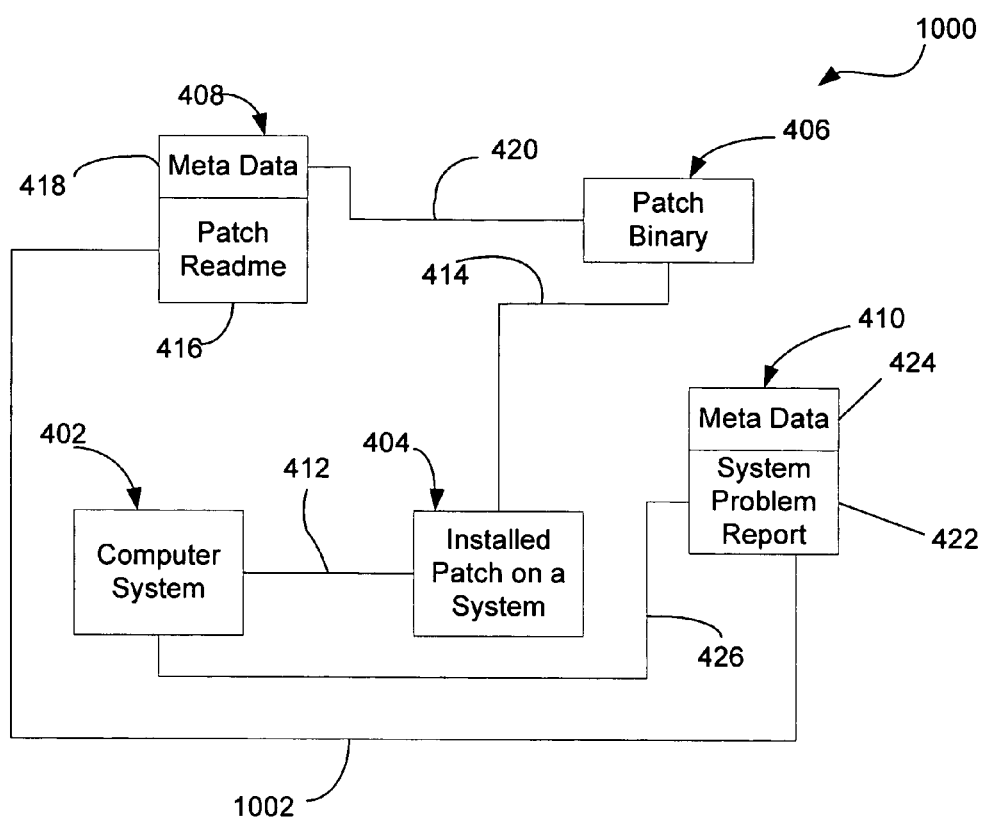
FIG. 10 depicts the information model shown in FIG. 4 modified by the cache manager to include an association between two information model nodes in accordance with methods consistent with the present invention.

The cache manager 124 then determines whether the count of the information model nodes traversed is greater than a predetermined threshold of nodes (step 908). If the count is greater than the predetermined threshold of nodes, the cache manager 124 generates an association between a first and a last of the information model nodes (step 910). The cache manager 124 is able to recognize that the predetermined threshold of nodes identifies the maximum number of nodes that may be traversed before a new association is generated between a first and a last of the traversed nodes to improve access efficiency or response time for an expected corresponding query from the business service application. For example, an administrator of the information model infrastructure 400 or 700 may identify to the cache manager 124 that the predetermined threshold of nodes to be traversed before generating a new association is three. In this example, the cache manager 124 is operatively configured to generate an association between the first node 410 and the last node 408 traversed by the cache manager 124 when the count of nodes traversed exceeds three. As shown in FIG. 10, the cache manager 124 generates an association 1002 between the first node 410 associated with the "system problem report" document 422 and the last node 408 associated with the "patch readme" 416 that identifies the correction to the fault reported in the "system problem report" document 422. Thus, when another problem report is received from a user and a corresponding query for a correction is received from the business service application 120, the cache manager 124 is able to identify the responsive node 416 (e.g., "patch readme" document 416) quicker using the new association 1002 between the first node 410 that identifies the "system problem report" 422 and the last node 416 (e.g., "patch readme") that identifies "patch binary" 406 as the correction to the reported fault.

Next, the cache manager 124 stores the association with at least the first information model node traversed by the cache manager 124 in response to the query from the business service application (step 912) before ending processing. For example, the association 1002 generated by the cache manager 124 may be a pointer to or an index that identifies the last information model node 408 as being directly associated with the first information model node 410 traversed by the cache manager 124 in response to a query from the business service application 120. The cache manager 124 stores the association 1002 in association with the first information model node 410, such as part of the access pattern (e.g., runtime access meta data 710) of the respective node 410. The cache manager 124 may also store a corresponding pointer to or index with the last node 408 to reflect the association 1002 with the first node 410.

If the count of the information model nodes traversed is not greater than the predetermined threshold of nodes, the cache manager 124 ends processing.

FIGS. 4 and 7 each identify an example informational model 400 or 700 having only five nodes. It is contemplated that an information model consistent with the present invention may have hundreds of nodes with corresponding associations between the nodes. Thus, by performing the process 600, the cache manager 124 is able to significantly reduce a response time to subsequent same or similar queries from a business service application 120.

Figure 11:
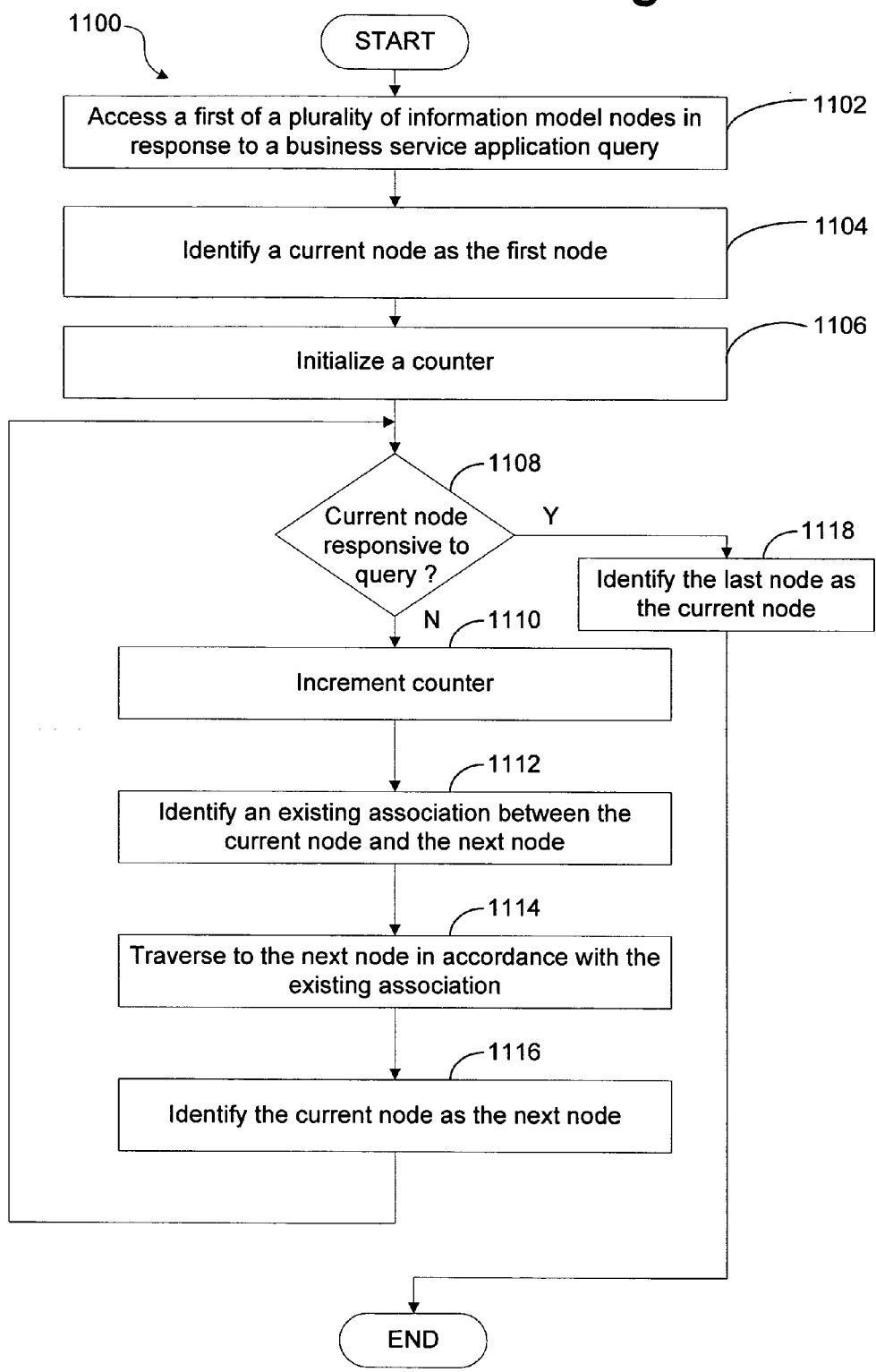
FIG. 11 depicts a flow diagram illustrating another exemplary process performed by the cache manager to traverse a plurality of information model nodes to determine whether to generate an association between two information model nodes.

FIG. 11 depicts a flow diagram illustrating another exemplary process 1100 performed by the cache manager to traverse a plurality of information model nodes to determine whether to generate an association between two information model nodes in accordance with the present invention. Initially, the cache manager 124 accesses a first (e.g., node 410 in FIG. 7) of a plurality of information nodes in response to a query from the business service application (step 1102). The cache manager 124 then identifies a current node as the first node (step 1104) and initializes a counter (step 1106). The counter (not shown in the figures) may be incorporated in the cache manager 124. The cache manager 124 uses the counter to track the count of information model nodes traversed in response to the query. Thus, the cache manager 124 may initialize the counter to one to reflect traversing the first node 410.

Next, the cache manager 124 determines whether the current node is responsive to the query (step 1108). The cache manager 124 may determine whether the current node (e.g., the first node 410) is responsive to the query by examining one or more parameters of the query. For example, the query may comprise a first parameter that identifies the "system fault error," which may correspond reported by user's computer system 104a when the fault occurred, and may be a first data element that is incorporated in the meta data 424, access prediction meta data 510, or runtime access meta data 710 of the node 410 having the "system problem report" document 422. In this example, the query may also comprise a second parameter that identifies the "system fault error corrected," which corresponds the identifier for the correction to the "system fault error" reported by user's computer system 104a when the fault occurred. This second query parameter may correspond to a second data element that is incorporated in the meta data 418, access prediction meta data 508, or runtime access meta data 708 of the node 408 having the "patch readme" document 416. The cache manager 124 may then determine whether the meta data 424 (if present), the access prediction meta data 510, or runtime access meta data 710 includes the data element responsive to the query parameters. In the example illustrated in FIG. 7, the cache manager 124 is able to recognize that the first node 410 does not have a data element responsive to the second parameter of the query that specifies the "system fault error corrected" or the identifier for the correction to the "system fault error" reported by user's computer system.

The cache manager 124 then increments the counter (step 1110), identifies an existing association between the current node and a next node (step 1112), and traverses to the next node in accordance with the association (step 1114). Continuing with the example shown in FIG. 7, the cache manager 124 is able to identify that the first node 410 associated with the "system problem report" document 422 has an existing association 426 with the next node 402 corresponding to the data model for a "computer system," which may be identified in the access pattern or runtime access meta data 710 of the first node 410.

After traversing to the next node (e.g., node 402), the cache manager 124 identifies the current node as the next node (step 1116) and continues processing at step 1108. If the current node is responsive to the query, the cache manager 124 identifies the last node as the current node before ending processing or continuing processing at step 906 of process 900. In the example illustrated in FIG. 7, the cache manager 124 is able to identify the node 408 having the "patch readme" document 416 is responsive to the query from the business service application 120 by identifying a data element responsive to a query parameter in the meta data 418, the access prediction meta data 508, or in the runtime access meta data 708 of the node 408. For example, a second data element of node 408 "system fault error corrected" stored in meta data 418 corresponds to "system fault error" reported by the user's system 104a when the fault occurred. Thus, the cache manager 124 is able to traverse a plurality of nodes 410, 402, 404, 406, and 408 to identify a first node 410 and a last node 408 and to determine whether a new association should be generated between the first and last nodes to expedite the processing of a subsequent query from the business service application.

Figure 12:
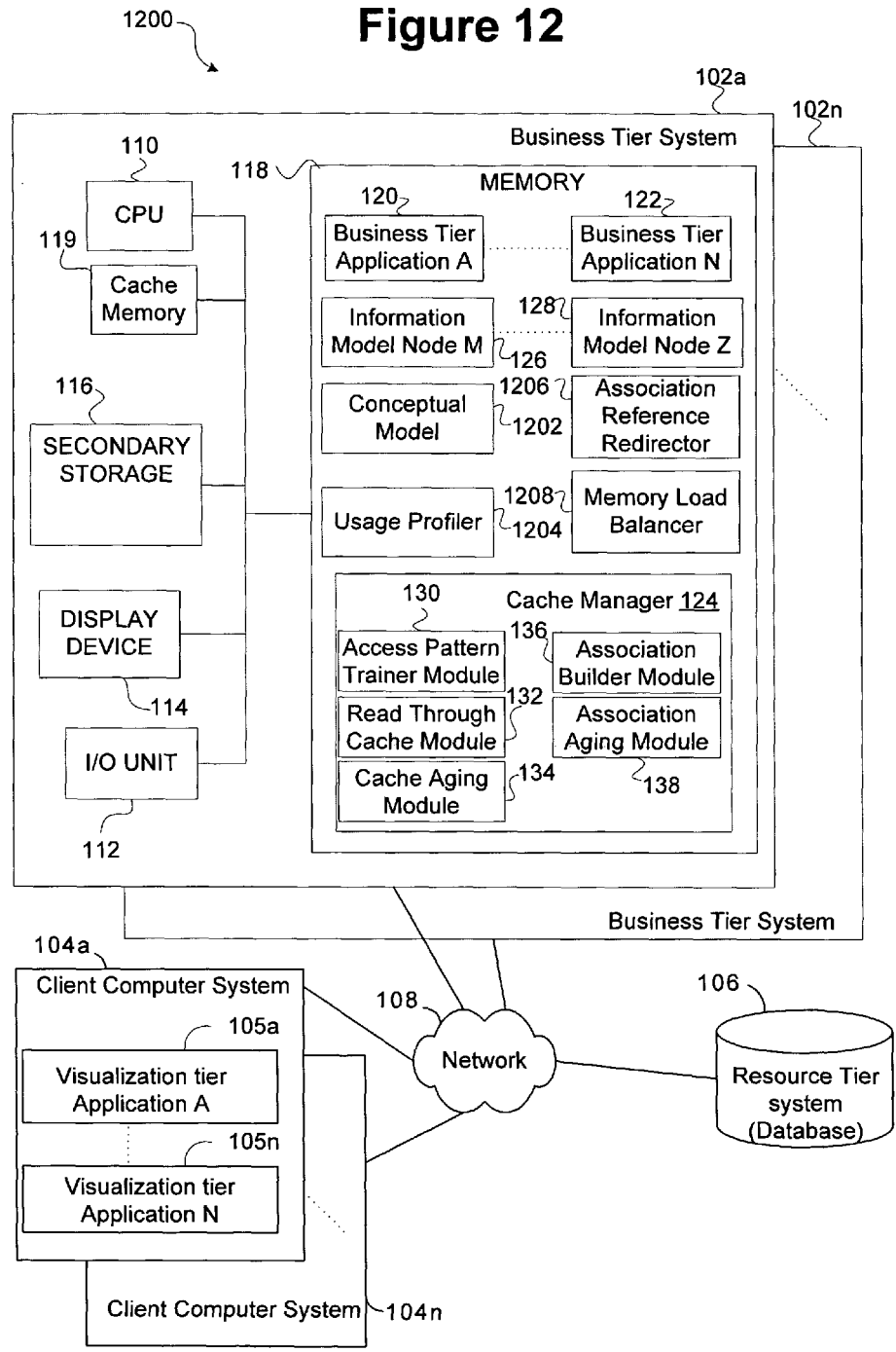
FIG. 12 depicts an exemplary block diagram of another data processing system suitable for implementing methods and systems consistent with the present invention.
Figure 13:
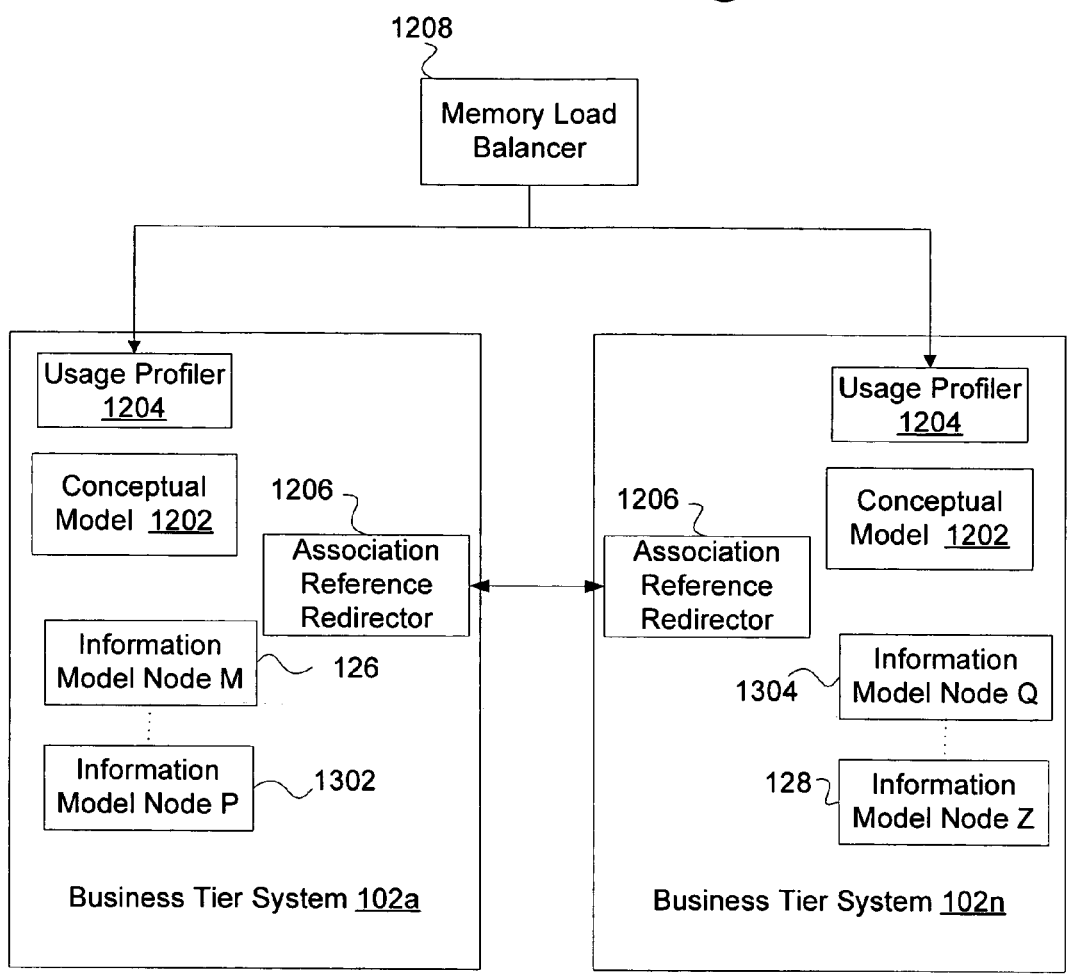
FIG. 13 depicts an exemplary functional block diagram of the data processing system in FIG. 12, where the information model nodes are distributed between two or more business tier systems in accordance with methods and systems consistent with the present invention.

FIG. 12 depicts an exemplary block diagram of another data processing system 1200 suitable for implementing methods and systems consistent with the present invention. The data processing system 1200 corresponds to system 100. Each business tier system 102a-102n of the system 1200 also includes a conceptual model 1202 used to build or instantiate the information model nodes 126 and 128, a usage profiler 1204, and an association reference redirector 1206. One of the business tier systems (e.g., business tier system 102a) also includes a memory load balancer 1208, which may be stored in memory 118 of the one business tier system 102a. Each of the components 1202, 1204, and 1206 may also be stored in memory 118 of the respective business tier system 102a. FIG. 13 depicts an exemplary functional block diagram 1300 of the data processing system 1200, where the information model nodes 126, 1302, 1304, and 128 have been distributed between two business tier systems 102a and 102n in accordance with methods consistent with the present invention as discussed below.

The usage profiler 1204 incorporates the functionality of the "access pattern trainer module" 130 such that the usage profiler 1204 may operate independently of the cache manager 124 to monitor access to each information model node 126 and 128 stored on the same business tier system 102a-102n as the usage profiler 1204 as shown in FIG. 1. The usage profiler 1204 is further operatively configured to generate or update an access pattern for each information model node based on a number of accesses to the respective information model node. The usage profiler 1204 is also operatively configured to rank each or the information model nodes 126 or 128 based on the number of monitored accesses to each information model node. As described in detail below, the usage profiler 1204 may also store the ranking of each information model node 126 or 128 in association with a corresponding node in the conceptual model 1202 or in the access pattern of the respective information model node. In addition, the usage profiler 1204 is operatively configured to identify a weak association between two (e.g., 1302 and 1304 in FIG. 14) of the nodes (e.g., 126, 1302, 1304, and 128 in FIG. 14) based on the ranking of each of the plurality of information model nodes, and to distribute the plurality of nodes 126, 1302, 1304, and 128 between two or more of the business tier systems 102a-102n based on the identified weak association so that the information model nodes 126, 1302, 1304, and 128 may be collectively managed by the business tier systems 102a-102n without retrieving one of the nodes 126, 1302, 1304, and 128 from persistent storage (e.g., secondary storage 116 or resource tier system 106). Upon distribution, each business tier system 102a and 102n stores a respective portion of the nodes 126, 1302, 1304, and 128 in its system memory 118 or in its cache memory. Thus, methods and systems consistent with the present invention improves response time for handling a query from the business service application 120 by allowing each of the information model nodes 126, 1302, 1304, and 128 to be stored in respective memory 118 or cache memory 119 of the business tier systems 102a and 102n and eliminating the need to retrieve one of the nodes from persistent storage 116 or 106.

The association reference redirector 1206 is operatively configured to initiate a transfer to another reference redirector on another business tier system 102n of a portion of the nodes (e.g., nodes 1304 and 128 in FIG. 13) identified by the usage profiler 1204 on business tier system 102a for distribution. The association reference redirector 1206 is also operatively configured to receive, via a first business tier system 102a, a request from the business service application to traverse the weak association identified by the usage profiler 1204 and to redirect the request to another association reference redirector 1206 residing on another business tier system 102n where a second 1304 of the two anodes 1302 and 1304 having the weak association resides. In addition, the association reference redirector 1206 is operatively configured to receive or intercept each request to traverse the weak association to the second node 1304, to calculate a number of the requests received, to determine whether the number of requests exceeds a predetermined threshold, and in response to determining that the number of requests exceeds the predetermined threshold, to prompt the usage profiler 1204 on the first business tier system 102a to re-rank each of the plurality of nodes. In response to the prompt from the association reference redirector 1206, the usage profiler 1204 on the first business tier system 102a is operatively configured to identify another weak association between two of the nodes (e.g., 126, 1302, 1304, and 128 in FIG. 14) based on the re-ranking of each of the plurality of information model nodes, and to re-distribute the plurality of nodes 126, 1302, 1304, and 128 between two or more of the business tier systems 102a-102n to collectively manage the information model nodes 126, 1302, 1304, and 128. In one implementation, when the nodes 126, 1302, 1304, and 128 have been distributed between business tier systems The memory load balancer 1208 is operatively connected to each usage profiler 1204 on each business tier system 102a-102n. Each usage profiler 1204 reports, preferably periodically, to the load balancer 1206 the identify of each of the information model nodes 126 and 128 that reside in memory on the business tier system 102a and 102n in which the respective usage profiler resides. After each usage profiler 1204 informs The memory load balancer 1208 is operatively configured to receive a query to access one of the information model nodes 126 and 128 from the business service application 120 or 122 and to redirect the query to a respective one of the business tier systems having the one information model node in accordance with the distribution of the information model nodes distributed in accordance with the present invention to business tier systems 120 and 122 and to direct the request to the respective system 102a, 102n for processing.

Figure 14:
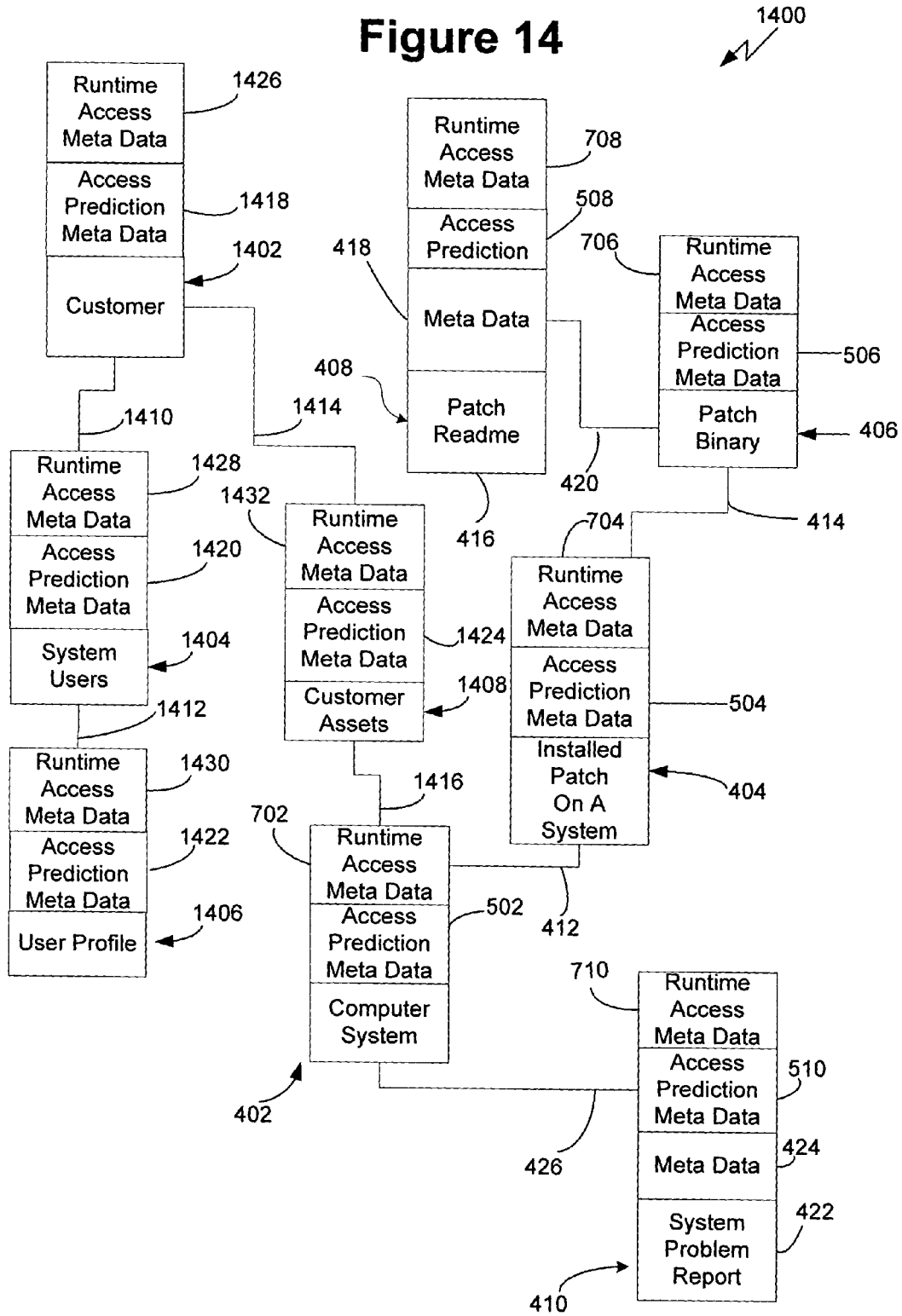
FIG. 14 depicts a block diagram of another exemplary infrastructure of information model nodes that may be accessed by a business service application of the data processing system in FIG. 12.

FIG. 14 depicts a block diagram of another exemplary infrastructure 1400 of information model nodes that may be processed by the usage profiler 1204 in accordance with methods consistent with the present invention as discussed below. In this example, the information model infrastructure 1400 corresponds to the information model infrastructure 700 in FIG. 7 for a business service application 120 that provides a computer system fault reporting and identification service to one or more customers operating client computer systems 104a-104n. The infrastructure 1400 of information model nodes corresponds to and is instantiated from the conceptual model 1202. In the illustrative example shown in FIG. 14 and for brevity in the description, the infrastructure 1400 includes nodes 402 . . . 410 and nodes 1402 . . . 1408 for supporting one customer via the business service application 120. However, additional corresponding information model nodes may be built or instantiated from the conceptual model 1202 to allow the business service application 120 to support multiple customers in accordance with methods and systems consistent with the present invention. Furthermore, the information model 1400 or conceptual model 1202 for the computer system fault reporting and identification may contain hundreds or thousands of nodes. However, for clarity in the description to follow, only nodes 402 . . . 410 and nodes 1402 . . . 1408 are illustrated in FIG. 14.

Information model nodes 402 . . . 410 are described above. Information model nodes 1402 . . . 1408 may be designed to identify data specific to a particular customer using the business service application 120 for computer system fault reporting and identification service. In this example, the information model node 1402 corresponds to structure data that describes a customer that has assets (e.g., computer systems purchased from Sun Microsystems, Inc. or software purchased form Microsoft, Inc.) to be serviced by the business service application 120. Table 2 below identifies an illustrative format of the structure data for the information model node 1402 to describe a customer of the business service application 120.

TABLE 2

| Element Name | Description | Data Type |
| --- | --- | --- |
| Customer Name | Name of Person, Company or organization. | String |
| Mailing Address | Mailing address of customer. | String |
| Billing Address | Billing address of customer | String |
| Dunn & Bradstreet Identifier | Identifier Used To Reference Customer On Public Stock Exchange | String |
| Web URL | Primary Network Address for Customer | String |

The information model node 1404 corresponds to structured data that identifies system users of the customers computer network. The systems users information model node 1404 includes data elements that identify a system user of the customer identified by node 1402. For example, the structured data of system users node 1404 may include data elements such as user name, user id, user password, and user contact address. The information model node 1402 has a pointer or index to the information model node 1404 to reflect the association 1410 between the two nodes.

The information model node 1406 corresponds to structured data that identifies user profile information for each of the system users identified by node 1404. Thus, information model node 1404 has a pointer or an index to the information model 1406 to reflect the data association 1412 between the two nodes. The user profile model node 1406 may include data elements that identify a respective user's profile, for example: user computer screen preferences, time of day for contacting the user, or other preferences for visualization tier applications 105a-105n (e.g., Microsoft® Word application) accessed by the user.

The information model node 1408 corresponds to structured data that identifies assets for the customer identified by the information model node 1402. Thus, the information model node 1402 may have a pointer or index to the information model node 1408 to reflect the association 1414 between the two nodes. The information model node 1408 may include data elements that identify customer assets, for example: a unique asset id, network or Internet address for customer assets, contact name for the customer, hardware assets, and software assets. In addition, "computer system" node 402 identifies one type of customer assets identified by the "customer assets" node 1408. Thus, the "customer assets" node 1408 has an association 1416 with the "computer system" node 402.

Each node 1402 . . . 1408 may have access prediction meta data 1418 . . . 1424 and run time access meta data 1426 . . . 1432 stored in association with each respective node 1402 . . . 1408 in accordance with methods consistent with the present invention.

Figure 15:
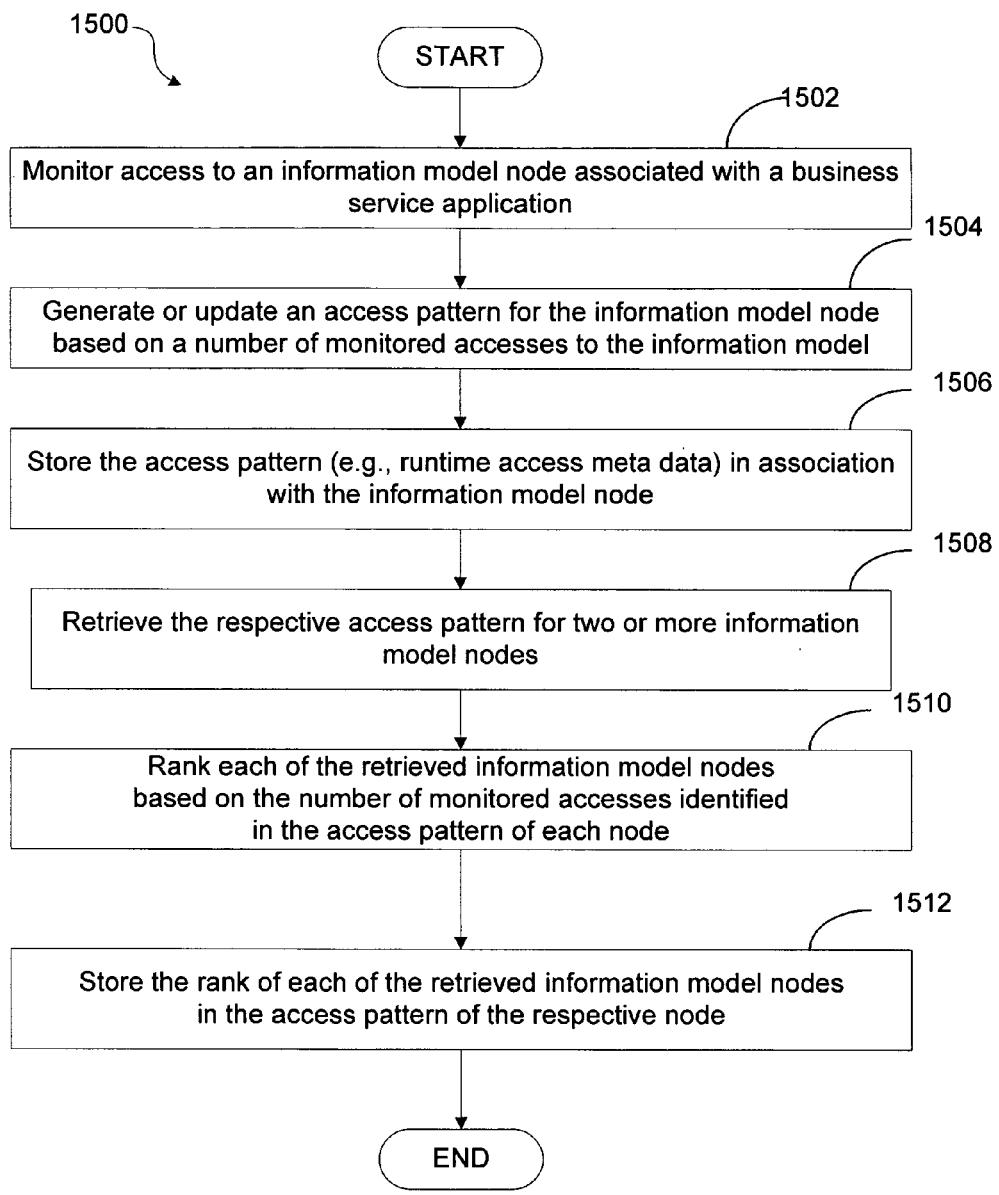
FIG. 15 depicts a flow diagram illustrating an exemplary process performed by a usage profiler of the data processing system in FIG. 12 to identify an access pattern for an information model node associated with the business service application and to rank each information model node based on the access pattern of the respective node.

FIG. 15 depicts a flow diagram illustrating an exemplary process 1500 performed by a usage profiler 1204 of the data processing system 1200 to identify an access pattern for an information model node 402 . . . 410 and 1402 . . . 1408 and to rank each information model node based on the access pattern of the respective node. Initially, the usage profiler 1204 monitors access to an information model node associated with a business service application (step 1502). In one implementation, the usage profiler 1204 monitors access for each information model node 402 . . . 410 and 1402 . . . 1408 in the manner described above for the access pattern trainer module 130. In this implementation, the business service application 120 may query the information model infrastructure 1200 via cache manager 124 or a model manager (not shown in the figures) of the data processing system 1200. The usage profiler 1204 is operatively configured to intercept or receive the query from the business service application 120 in order to monitor access to the information model nodes 402 . . . 410 and 1402 . . . 1408 before or while the query is being processed by the cache manager 124 or the model manager. For example, in response to a business service application's 120 query or request for a correction for the reported fault identified in the "system problem report" document 422, the usage profiler 1204 may access the node 410. Continuing with the example shown in FIG. 14, in response to a business service application's 120 query or request for the identification of all system users for a particular customer, such as Cingular Wireless, Inc. or Merrill Lynch & Co., Inc., the usage profiler 1204 may first access the "customer" node 1402 and then traverse the association 1410 to access the "system users" node 1404 that is responsive to the query from the business service application. Each information model node 402 . . . 410 or 1402 . . . 1408 may be accessed directly by the usage profiler 1402 if the query from the business service application 120 directly references the node 402 . . . 410 or 1402 . . . 1408. For example, information model node 1402 may be directly accessed by the usage profiler 1402 in response to a query from the business service application 120 to provide the "mailing address" of a customer identified by information model node 1402. In another example, the information model node 406 may be directly accessed by the usage profiler 1402 in response to a query from the business service application 120 to return the identity of the author of the "patch readme" document 416, which the usage profiler 1402 is able to recognize as stored by the node 408 identified as the "patch readme" node.

Next, the usage profiler 1204 generates or updates an access pattern for the information model node based on a number of monitored accesses to the information model node (step 1504). If the monitored node does not have an access pattern, the usage profiler 1402 generates a new access pattern (e.g., via the cache manager 124) by creating runtime access meta data 702 . . . 710 or 1426 . . . 1432 for the accessed node 402 . . . 410 or 1402 . . . 1408 and initializes an access number in the respective access pattern as discussed above. The next time the node 402 . . . 410 or 1402 . . . 1408 is read by the cache manager 124 in response to another query from the business service application 120, the usage profiler 1204 updates the access pattern of the node by, for example, incrementing the access number stored in the runtime access meta data 702 . . . 710 1426 . . . 1432 associated with the respective node 402 . . . 410 or 1402 . . . 1408.

The usage profiler, 1204 then stores the access pattern in association with the respective information model node (step 1506). Steps 1504, 1506 and 1508 may also be performed by the cache manager 124 consistent with process 600 in FIG. 6.

Once the access patterns have been generated or updated, the usage profiler 1204 then retrieves the respective access pattern for two or more information model nodes (step 1508).

The usage profiler 1204 then ranks each of the retrieved information model nodes 402 . . . 410 and 1402 . . . 1408 based on the number of monitored accesses identified in the access pattern of each node (step 1510). Next, the usage profiler 1204 stores the rank of each of the retrieved information model nodes 402 . . . 410 and 1402 . . . 1408 in the access pattern of the respective node (step 1512) before ending processing.

Thus, the usage profiler is operatively configured to monitor information nodes 402 . . . 410 and 1402 . . . 1408, generate access patterns for each node that identifies the number of accesses to the node and ranks each of the nodes based on the respective number of accesses to each node. In accordance with methods in systems consistent with the present invention the usage profiler 1204 enables a weak association to be identified within the information model 1400 based on the ranking of the respective information model nodes.

For illustrative purposes in the discussion to follow, it assumed that the business service application has queried the information model infrastructure 1400 as follows over a predefined period as shown in Table 3 below.

TABLE 3

| Information Model Node | Number of Accesses For Predefined Period | Ranking Based On Number Of Accesses |
|---|---|---|
| "Customer" Node 1402 | 80 | 7 |
| "System Users" Node 1404 | 40 | 9 |
| "User Profile" Node 1402 | 60 | 8 |
| "Customer Assets" Node 1408 | 100 | 6 |
| "Computer System" Node 402 | 500 | 1 |
| "Installed Patch On A System" Node 404 | 300 | 2 |
| "Patch Binary" Node 406 | 300 | 3 |
| "Patch Readme" Node 408 | 250 | 4 |
| "System Problem Report" Node 410 | 225 | 5 |

Figure 16:
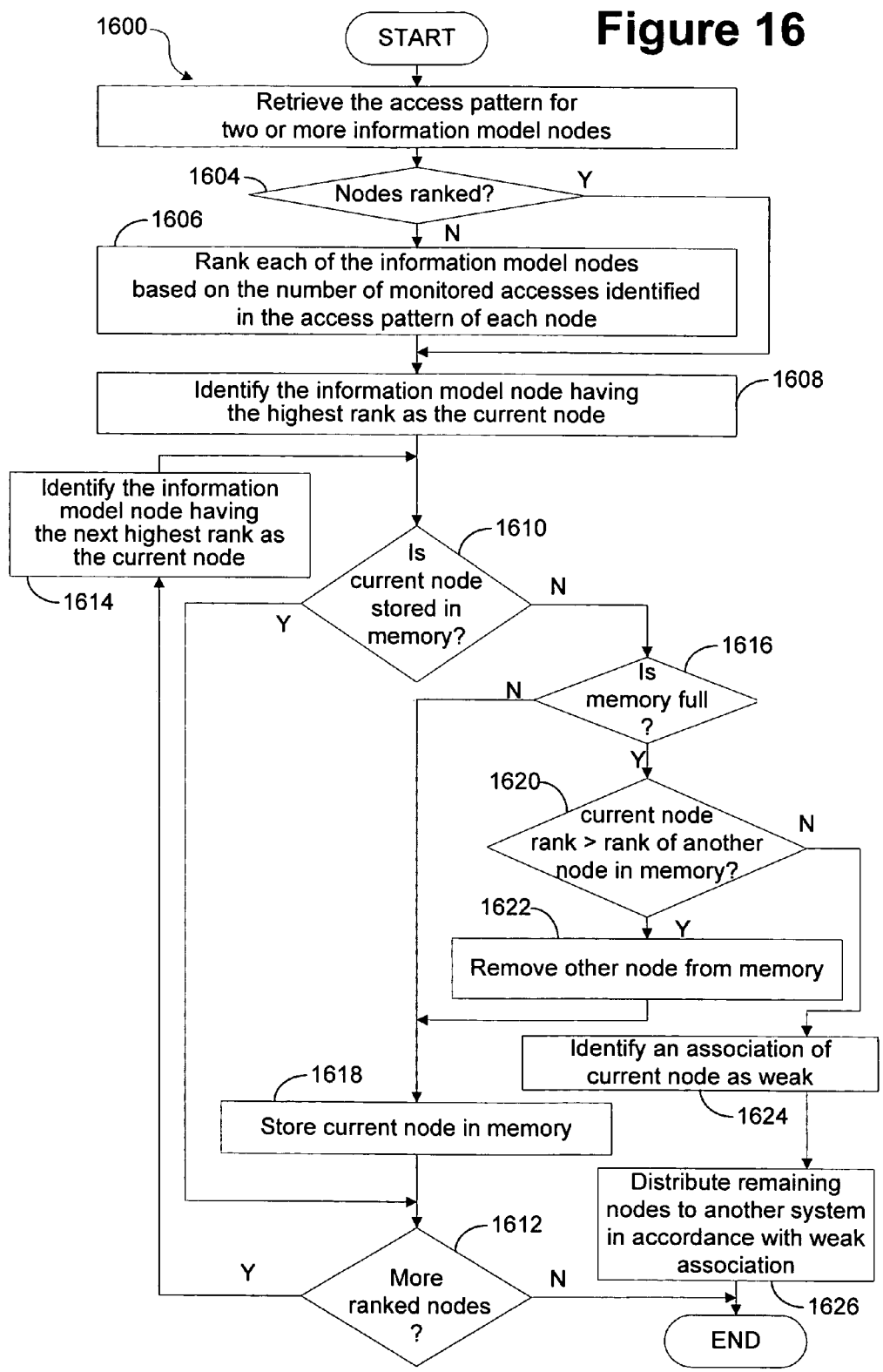
FIG. 16 depicts a flow diagram illustrating another exemplary process performed by the usage profiler to identify one of the ranked information model nodes as having a weak association and to distribute a portion of the information model nodes to another business tier system to manage in accordance with the weak association.

FIG. 16 depicts a flow diagram illustrating another exemplary process 1600 performed by the usage profiler 1204 to identify one of the ranked information model nodes that has a weak association and to distribute a portion of the information model nodes to another business tier system to manage in accordance with the weak association. Initially, the usage profiler 1204 retrieves the access pattern for two or more information model nodes (step 1602). For example, the usage profiler 1204 may retrieve each of the information model nodes 402 . . . 410 and 1402 . . . 1408. The usage profiler 1204 then determines whether the information model nodes have already been ranked (step 1604). The usage profiler 1204 may identify whether the nodes have been ranked by retrieving the access pattern or runtime access meta data 702 . . . 710 or 1426 . . . 1432 associated with the respective information model node and inspecting the access pattern 702 . . . 710 or 1426 . . . 1432 for a corresponding ranking.

If the information model nodes have been ranked, the usage profiler 1204 continues processing at step 1608. If the information model nodes have not been ranked, the usage profiler 1204 then ranks each of the information model nodes based on the number of monitored accesses identified in the access pattern of each node (step 1606). For example, the usage profiler 1204 may rank the information model nodes as indicated in Table 3 based on the number of monitored accesses to each node 402 . . . 410 and 1402 . . . 1408 over the predefined period. When the usage profiler 1204 identifies two nodes (e.g., nodes 404 and 406) as having the same number of monitored accesses, the usage profiler 1204 may rank one of the nodes higher than the other or provide each of the two nodes the same ranking.

Next, the usage profiler 1204 identifies the information model node having the highest ranked as the current node (step 1608). In the example shown in Table 3, the usage profiler 1204 is able to identify the "system computer" node 402 as having the highest ranking among the information model nodes 402 . . . 410 and 1402 . . . 1408.

The usage profiler 1204 then determines whether the current node is already stored in memory (step 1610). The usage profiler 1204 may search memory 118 or cache memory 119 of the business tier system 102a to determine whether the current node (e.g., node 402) is already stored in memory. If the current node is already stored in memory, the usage profiler 1204 then determines whether there are more nodes ranked below the ranking of the current node (step 1612). If there are no more nodes ranked below the ranking of the current node (e.g., node 402), then the usage profiler 1204 ends processing as all of the retrieved nodes 402 . . . 410 and 1402 . . . 1408 are already stored in memory 118 or cache memory 119 so a weak association does not need to be identified.

If there are more nodes ranked below the ranking of the current node, then the usage profiler 1204 identifies the information model node having the next highest rank as the current node (step 1614) and continues processing at step 1610. In the example shown in Table 3, the usage profiler 1204 identifies the "Installed Patch On A System" node 404 as having the next highest rank, and thus, identifies this information model node 404 for subsequent processing at step 1610.

If it is determined that the current node is not already stored in memory, then the usage profiler 1204 determines whether memory is full or alternatively whether there is space available in memory for storing the current node (step 1616). If memory is not full or there is space available for storing the current node, the usage profiler 1204 stores the current node in memory (step 1618) and continues processing at step 1612. The usage profiler 1204 may store the current node in memory 118 or cache memory 119 directly or via the cache manager 124. Thus, in this implementation, the usage profiler 1204 stores all or a first portion of the nodes 402 . . . 410 and 1402 . . . 1408 having a higher ranking than a second portion of the nodes 402 . . . 410 and 1402 . . . 1408 in memory 118 or cache memory 119 of one of the business tier systems 102a.

If memory is full or there is no space available for the storing the current node, the usage profiler 1204 determines whether the current node has a ranking that is greater than the ranking of another node stored in memory (step 1620). If the current node has a higher ranking than the ranking of another node in memory, the usage profiler 1204 removes the other node from memory (step 1622) and continues processing at step 1618. Thus, the usage profiler 1204 allows nodes that are accessed the most frequently by the business service application 120 or 122 to be stored in memory 118 or cache memory 119 rather than in persistent storage, such as secondary storage 116 or resource tier system 106 so that the time to respond to a business service application query may be optimized.

If the current node does not have a ranking greater than the ranking of another node in memory, the usage profiler 1204 identifies an association of the current node as a weak association (step 1624). For example, assuming that the usage profiler 1204 continues processing as described and is able to store information model nodes 402, 404, 406, 408, 410, and 1408 in memory, the usage profiler 1204 then recognizes information model node 1402 as the current node since it has the next highest ranking after information model node 1408 as shown in Table 3. In one implementation, the usage profiler 1204 identifies the weak association of the current node 1408 by selecting the association 1414 between the current node 1402 and the next higher ranking node 1408. In this implementation, when there are interim nodes (not shown in figures) between the current node 1402 and the next higher ranking node 1408 that the usage profiler 1204 has stored in memory 118 or 119, the usage profiler 1204 identifies the weak association as the association between the one interim node that has a direct association (e.g., association 1414) to the next highest ranking node 1408. Thus, the usage profiler 1204 is able to identify a weak association between two of the nodes (e.g., nodes 1402 and 1408) based on the ranking of each of the information model nodes 402 . . . 410 and 1402 . . . 1408. The first of the two nodes 1408 has a higher ranking than the second of the two nodes 1402.

After identifying the weak association, the usage profiler 1204 then distributes the remaining nodes to another business tier system 102n in accordance with the weak association (step 1626) before ending processing. In one implementation, the usage profiler 1204 distributes each of the information model nodes (e.g., nodes 1402, 1404 and 1406 in FIG. 14 or nodes 1304 and 128 in FIG. 13) having a ranking less than the first of the two nodes 1408 to a second memory 118 or 119 on another business tier system 102n. The usage profiler 1204 in performing the process 1600 may store each of the information model nodes (e.g., nodes 402 . . . 410 and 1408 in FIG. 14 or nodes 126 and 1302 in FIG. 13) having a ranking higher than or equal to the first node 1408 on the first memory 118 of the first business tier system 102a where the usage profiler 1402 is operating.

As discussed above, the association reference redirector 1206 on the first business tier system 102a is operatively configured to initiate a transfer to another reference redirector on another business tier system 102n of a portion of the nodes (e.g., nodes 1402, 1404 and 1406 in FIG. 14 or nodes 1304 and 128 in FIG. 13) identified for distribution by the usage profiler 1204 on business tier system 102a. Thus, the reference redirector may be informed of the weak association 1414 by the usage profiler 1204. In another implementation, the usage profiler 1204 is operatively configured to mark the association 1414 in the conceptual model 1202 as the weak association so that the association reference redirector and the memory load balancer 1208 are each able to recognize the weak association 1414 and the corresponding distribution of the information model nodes 126, 1302, 1304, and 128.

After the information model nodes 126, 1302, 1304, and 128 or 402 . . . 410 and 1402 . . . 1408 are distributed by the usage profiler 1402, each association reference redirector 1406 enables the business tier systems to collectively manage access to the information model nodes 126, 1302, 1304, and 128 or 402 . . . 410 and 1402 . . . 1408. For example, the association reference redirector 1406 hosted on the first business tier system 102a that has the higher ranking node (e.g., node 1302 or 1408) of the two nodes 1302 and 1304 or 1402 and 1408 with the weak association (e.g., association 1414) may receive a request to traverse the weak association 1414, such as when the "customer" node 1402 is accessed in response to a query from the business service application 120 for the identification of all "computer systems" for the customer identified by "customer" node 1402. In this example, the "computer system" node 402 has data responsive to the query. Thus, nodes 1402, 1408, and 402 and the associations 1414 and 1416 between these nodes are requested to be traversed in order to identify the responsive data corresponding to the "computer system" node 402. In this implementation, the association reference redirector 1406 is able to redirect the request to the second business tier system 102n that has the second node 1304 or 1408 with the weak association 1414 to the first node 1302 or 1402.

In addition, after the information model nodes 126, 1302, 1304, and 128 or 402 . . . 410 and 1402 . . . 1408 are distributed by the usage profiler 1402, the memory load balancer 1408 may receive a query from the business service application to access one of the plurality of information model nodes, and then direct the query to one of the business tier systems having the one information model node (e.g., to the first business tier system 102a that has the node 1302) in accordance with the distribution of the plurality of nodes 126, 1302, 1304, and 128 by the usage profiler 1402. In one implementation, the memory load balancer 1408 is informed of the distribution of the nodes 126, 1302, 1304, and 128 by the respective usage profiler 1402. Alternatively, the memory load balancer 1408 may identify the distribution based on the identification or marking of the weak association 1414 in the conceptual model 1202 by the usage profiler 1204.

In another implementation, the association reference redirector 1206 of the first business tier system 102a is operatively configured to receive a plurality of requests to traverse the weak association 1414 to a second node (e.g., node 1304 in FIG. 13 or 1408 in FIG. 14), to calculate a number of the requests, to determine whether the number of requests exceeds a predetermined threshold, and to prompt the usage profiler 1204 of the first business tier system 102a to re-rank and to re-distribute each of the plurality of nodes 126, 1302, 1304, and 128 or 402 . . . 410 and 1402 . . . 1408 in response to determining that the number of requests exceeds the predetermined threshold.

Figure 17:
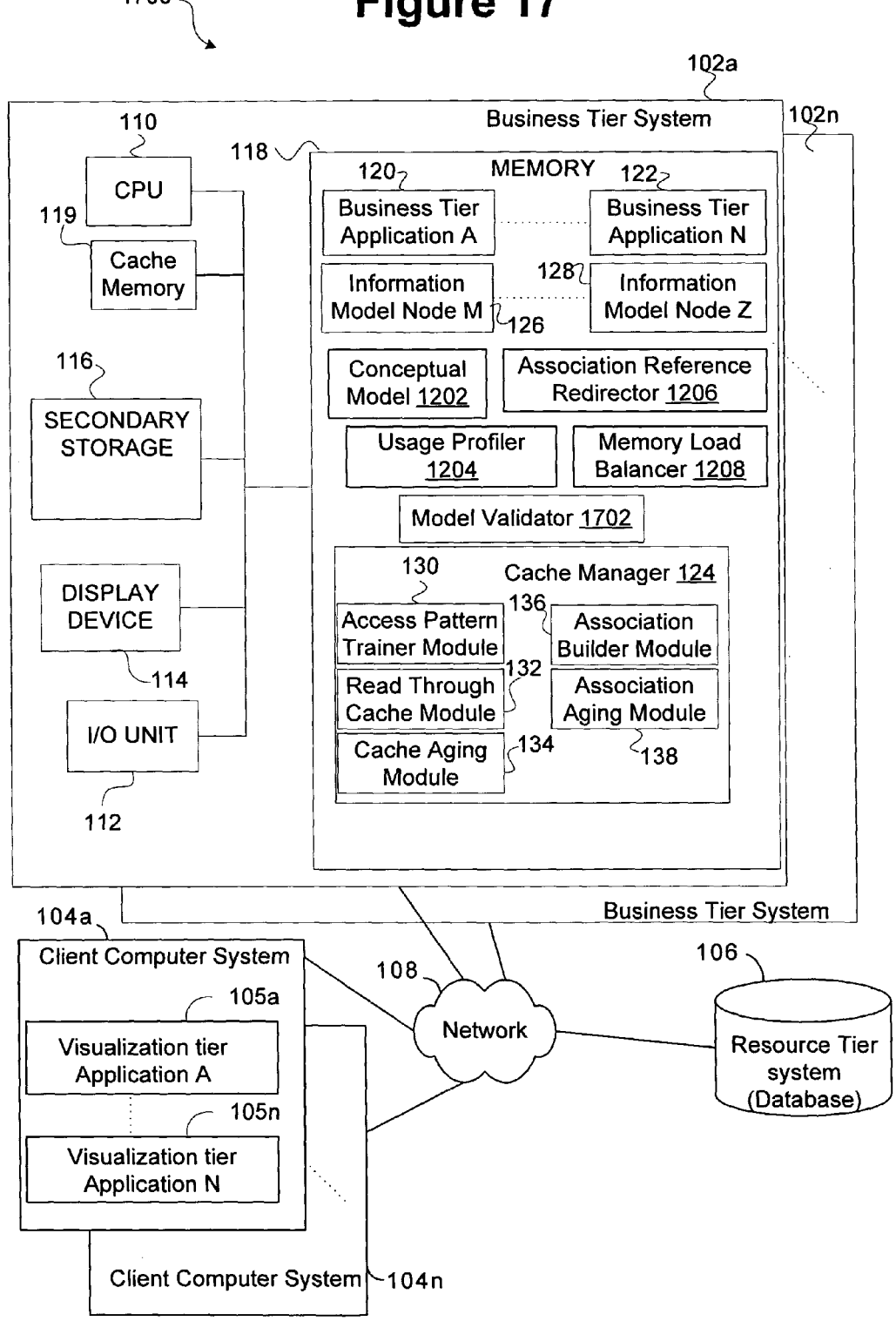
FIG. 17 depicts an exemplary block diagram of another data processing system suitable for implementing methods and systems consistent with the present invention.

FIG. 17 depicts an exemplary block diagram of another data processing system 1700 suitable for implementing methods and systems consistent with the present invention. The data processing system 1700 corresponds to system 100. The data processing system 1700 includes at least one business tier system 102a-102n that has a model validator 1702. As discussed in further detail below, the model validator 1702 is operatively configured to receive a request from a business service application 120 or 122 to store data associated with one of the information model nodes 126 or 128 in FIG. 1700, to determine whether the one node exists in the information model, and to generate a new node in the information model in response to determining that the one node does not exist. In one implementation, the model validator 1702 is operatively configured to generate the new node based on at least a portion of the data (e.g., a reference to an existing information model node) received with the request from the business service application and a current node in the information model that has substantially the same portion of the data.

As shown in FIG. 17, each business tier system 102a-102n of the data processing system 1700 may also include a conceptual model 1202, a usage profiler 1204, and an association reference redirector 1206. One of the business tier systems (e.g., business tier system 102a) may also include a memory load balancer 1206 as described above.

Figure 18A:
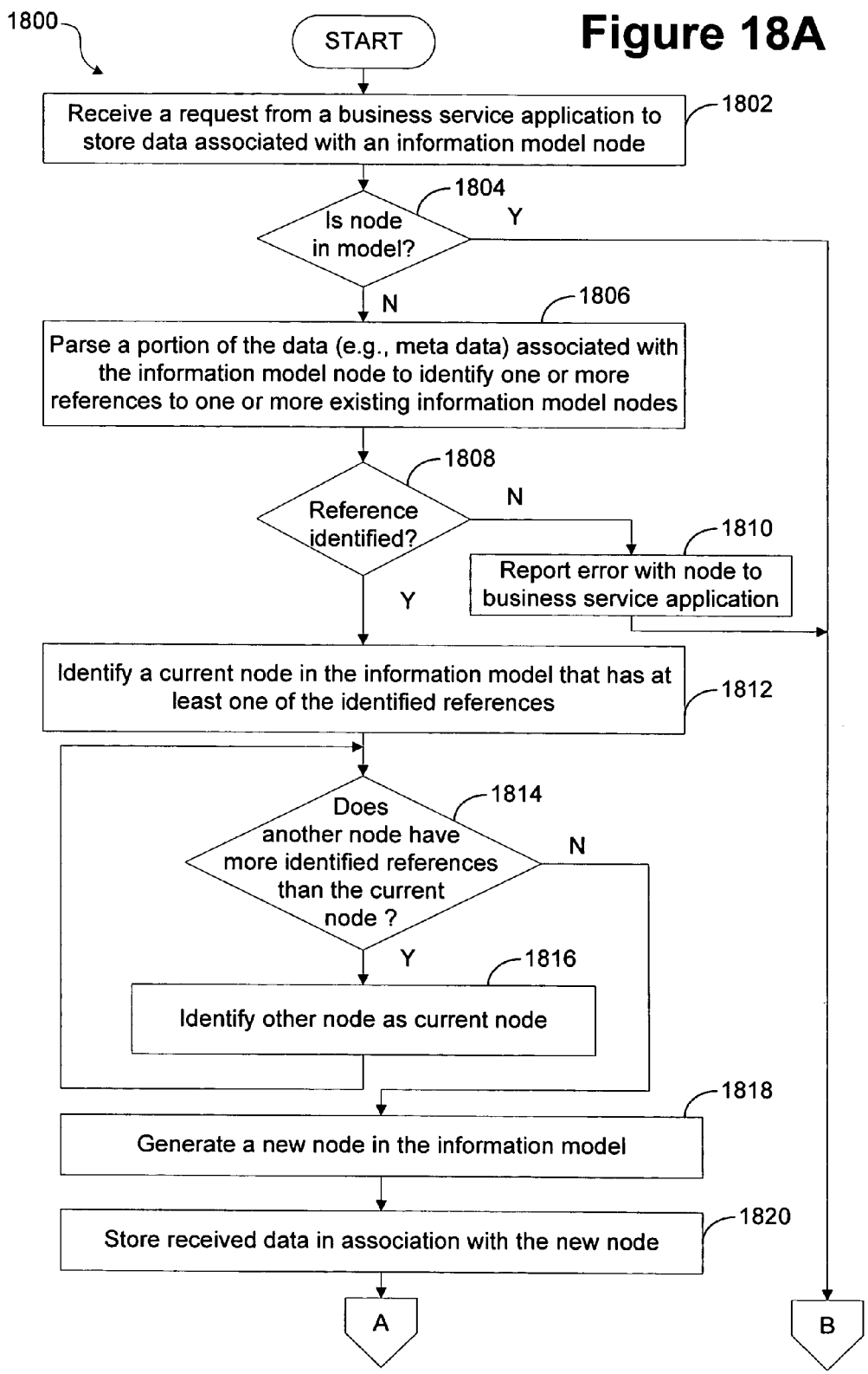
FIGS. 18A-B depict a flow diagram illustrating an exemplary process performed by a model validator of the data processing system in FIG. 17 to generate a new node in an information model.
Figure 18B:
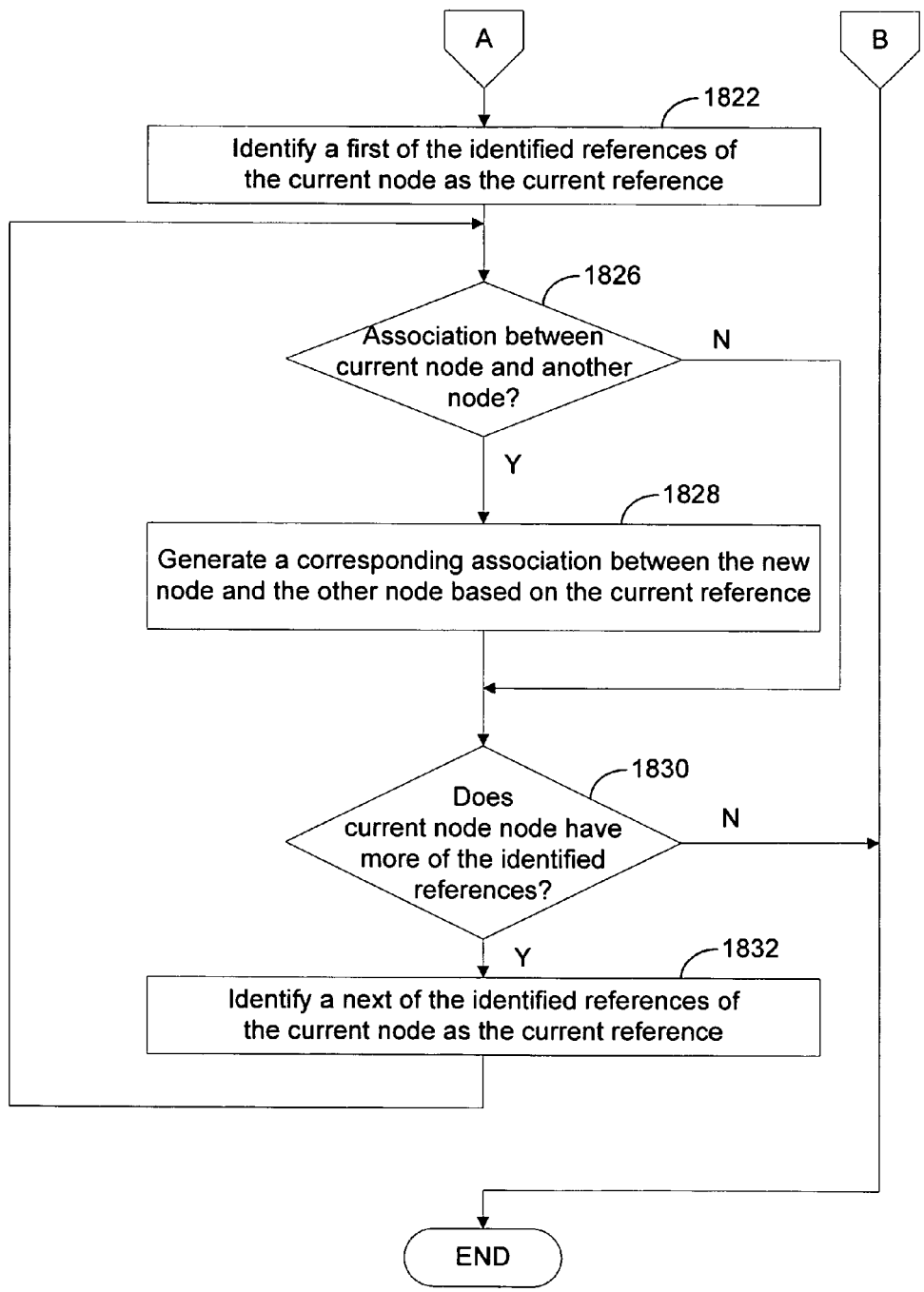

FIGS. 18A-B depict a flow diagram illustrating an exemplary process 1800 performed by the model validator 1702 to generate a new node in the information model nodes 126 and 128 in accordance with the present invention. FIG. 19 depicts the information model 1400 in FIG. 4 modified by the model validator to include a new node 1902 in accordance with the process 1800. Initially, the model validator 1702 receives a request from a business service application 120 or 122 to store data associated with an information model node (step 1802). In one implementation, the request includes a store command that has a first parameter identifying the node or class type and a second parameter identifying the data to be stored. Continuing with the example information model depicted in FIGS. 4 and 19, the business service application 120 may send a request that includes a store command having a first parameter identifying the node as a "firmware patch" node (e.g., node 1902) and a second parameter that identifies the data to be stored with the "firmware patch" node. The identified data may include the structured data corresponding to "firmware patch" and "access prediction meta data" 1904 provided by the author or designer of the "firmware patch." The "access prediction meta data" and the "firmware patch" may each include one or more references to one or more existing nodes 402 . . . 410 in the information model, which the model validator 1702 is able to recognize and use to generate the new node 1902 in the information model infrastructure 1400 as discussed in detail below. In one implementation, the references in the "access prediction meta data" may include: a "patch id" reference, an "applies to hardware" reference that identifies the "computer system" (e.g., a Sun computer system or an IBM computer system) in which the "firmware patch" is to be applied, and an "applies to software" reference that identifies the software package document (e.g., "patch readme" document 416) describes, among other things, the fault corrected by the "firmware patch."

After receiving the request from the business service application 120 or 122 to store data associated with an information model node, the model validator 1702 then determines whether the node exists in the information model (step 1804). In one implementation, the model validator 1702 determines whether the node exists by traversing each node 402 . . . 410 in the information model 1400 and comparing the node or class type identified by the first parameter of the data associated with the received request with the node name (e.g., "computer system" node) or class type of each traversed node 402 . . . 410.

If the node exists in the information model, the model validator 1702 ends processing. Otherwise, if the node does not exist in the information model, the model validator 1702 parses all or a portion of the data (e.g., access prediction metadata 1904 in FIG. 1900) associated with the information model node to identify one or more references to one or more existing information model nodes (step 1806). Thus, after receiving the above identified example request for storing data associated with a "firmware patch" node, the model validator 1702 is able to parse the "access prediction meta data" 1904 to identify the following references: the "patch id" reference, the "applies to hardware," and the "applies to software" reference.

Next, the model validator 1702 determines whether a reference has been identified (step 1808) from parsing the data. If a reference has not been identified, the model validator 1702 reports an error identifying that the node is not in the information model 1400 to the business service application (step 1810) and ends processing.

If a reference has been identified, the model validator 1702 then identifies a current node in the information model that has at least one of the identified references (step 1812). For example, the model validator 1702 may first traverse "computer system" node 402 in FIGS. 4 and 19, determine that it does not have any of the identified references, and then traverse "installed patch on a system" node 404. As previously discussed, "installed patch on a system" node 404 has the "applies to hardware" reference that identifies the computer system name in which a specific operating system patches or other software patches are installed. Thus, in this example, the model validator 1702 is able to recognize that the "installed patch on a system" node 404 has one of the identified references, namely the "applies to hardware" reference.

Next, the model validator 1702 determines whether another node has more of the identified references than the current node (step 1814). If another node has more of the identified references than the current node, then the model validator 1702 identifies the other node as the current node (step 1816) and continues processing at step 1814. In the example depicted in FIGS. 4 and 19, upon traversing to the "patch binary" node 406, the model validator 1702 is able to parse data associated with the "patch binary" node 406 (e.g., "access prediction meta data" 506) to determine that the node 406 has the identified references: the "patch id" reference that indicates the unique identifier assigned to the "patch binary" software, the "applies to hardware" reference and the "applies to software" reference.

Returning to FIG. 18A, if another node does not have more of the identified references than the current node, then the model validator 1702 generates a new node in the information model (1818). In the example information model shown in FIG. 19, the model validator 1702 generates the new node 1902 having the name and class type "firmware patch." Next, the model validator 1702 stores the received data in association with the new node (step 1820). In one implementation, the model validator 1702 stores the data (e.g., the "access prediction meta data" 1904 and the structured data for the "firmware patch") identified by the second parameter of the store command request received from the business service application 120.

Turning to FIG. 18B, the model validator 1702 identifies a first of the identified references of the current node as the current reference (step 1822). For example, the model validator may select the "applies to hardware" reference as the current reference. The model validator 1702 then determines whether there is an association between the current node and another node corresponding to the current reference (step 1826). In the implementation depicted in FIG. 17, the model validator 1702 is able to traverse or retrieve the current node, "patch binary" 406 and determine that the "applies to hardware" reference identifies the information model node 402, which identifies patches created for and to be installed on the computer system described by information model node 402. The model validator 1702 is also able to recognize that the association 414 (e.g., a pointer or index to the "installed patch on a system" node 404 reflects the "applies to hardware" reference.

If there is an association between the current node and another node corresponding to the current reference, the model validator 1702 generates a corresponding association between the new node and the other node based on the current reference (step 1828). Continuing with the example shown in FIG. 19, the model validator 1702 generates the corresponding association 1908 between the new node 1902 and the other node 404 based on the current "applies to hardware" reference. The association 1908 may be a pointer or index stored with the new "firmware patch" node 1902 to reflect its association to the "installed patch on a system" node 404. A pointer or index may also be stored by the model validator 1702 with the "installed patch on a system" node 404 to reflect the association 1902 with the new "firmware patch" node 1902. The model validator 1702 may store the "firmware patch" node 1902 and its associated data (e.g., the "access prediction meta data" 1904 and the structured data for the "firmware patch") along with the association 1908 in memory 118 or cache memory 119 where the other information model nodes 404 . . . 410 reside and in persistent storage (e.g., secondary storage 116 or resource tier system 106) in accordance with methods and systems consistent with the present invention.

After generating the corresponding association or if there is not an association between the current node and another node corresponding to the current reference, the model validator 1702 then determines whether the current node has any more of the identified references (step 1830). If the current node does have more of the identified references, the model validator 1702 identifies a next one of the identified reference of the current node as the current reference (step 1832) and continues processing at step 1824. If the current does not have any more of the identified references, the model validator 1702 ends processing. Thus, in the example illustrated in FIG. 17, the model validator 1702 identifies that the "patch binary" node 406 also has the "applies to software" reference (e.g., the next identified reference) identified in the command store request data for the "firmware patch" node, determines that the "applies to software" reference corresponds to the association 420 between the "patch binary" node 406 and the "patch readme" node 416, and generates a corresponding association 1910 between the new "firmware patch" node 1902 and the "patch readme" node 416 before ending processing.

In one implementation, the usage profiler 1204 of the data processing system 1700 monitors access to each of the information model nodes (e.g., nodes 402 . . . 410 in FIG. 19), and in response to the model validator 1702 generating a new node (e.g., node 1902) in the information model, ranks each of the plurality of nodes based on a number of monitored accesses to each node, identifies a weak association between two of the nodes based on the ranking of each of the plurality of information model nodes, and distributes the plurality of nodes between two or more of the plurality of memories in accordance with the weak association as described above.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method in a data processing system having a business service application and a plurality of memories, the method comprising the steps of:
    monitoring access to each of a plurality of information model nodes associated with the business service application;
    ranking each of the plurality of information model nodes based on a number of monitored accesses to each information model node;
    identifying a weak association between two of the information model nodes based on the ranking of each of the plurality of information model nodes, the identifying including determining that the two information model nodes have sequential rankings and wherein the weak association includes a pointer from one to another of the two information nodes; and
    distributing the plurality of information model nodes between two or more of the plurality of memories in accordance with the weak association, the distributing including determining a lower ranking one of the two information model nodes and distributing the lower ranking one to a different one of the memories than the other one of the two information model nodes.

2. The method of claim 1, further comprising the steps of:
    generating an access pattern for each information model node wherein each access pattern includes the number of monitored accesses to the respective information model node; and
    storing the access pattern for each information model node in association with the respective information model node.

3. The method of claim 1, wherein the data processing system has a plurality of business tier systems operatively connected to a network, each of the business tier systems having a respective one of the plurality of memories, such that a first of the two information model nodes is distributed to a first of the business tier systems and the lower ranking of the two information model nodes is distributed to a second of the business tier systems.

4. The method of claim 3, further comprising the steps of:
    receiving, via the first business tier system, a request to traverse the weak association to the second node; and
    redirecting the request to the second business tier system that has the second node.

5. The method of claim 3, further comprising the steps of:
    receiving, via the first business tier system, a plurality of requests to traverse the weak association to the second node;
    calculating a number of the requests;
    determining whether the number of requests exceeds a predetermined threshold; and
    when it is determined that the number of requests exceeds the predetermined threshold, re-ranking each of the plurality of information model nodes.

6. The method of claim 3, further comprising the steps of:
    receiving a query from the business service application to access one of the plurality of information model nodes; and
    directing the query to one of the business tier systems having the respective memory with the one information model node.

7. A method in a data processing system having a business service application and a plurality of memories, the method comprising the steps of:
    monitoring access to each of a plurality of information model nodes associated with the business service application;
    ranking each of the plurality of nodes based on a number of monitored accesses to each information model node;
    determining whether a first of the plurality of memories has space to store the two information model nodes, the first of the two information model nodes having a higher ranking than the second of the two information model nodes;
    when it is determined that the first of the plurality of memories does not have space to store the two information model nodes,
    identifying a weak association between two of the information model nodes based on the ranking of each of the plurality of information model nodes; and
    distributing the plurality of information model nodes between two or more of the plurality of memories in accordance with the weak association,
    wherein the step of distributing the plurality of information model nodes comprises the step of distributing each of the plurality of information model nodes having a ranking less than the ranking of the first node to a second of the plurality of memories, and wherein the step of distributing the plurality of information model nodes further comprises the step of storing each of the plurality of information model nodes having a ranking higher than or equal to the ranking of the first node in the first memory.

8. A computer-readable medium containing instructions for controlling a data processing system to perform a method, the data processing system having a business service application and a plurality of memories, the method comprising the steps of:

monitoring access to each of a plurality of information model nodes associated with the business service application;

ranking each of the plurality of information model nodes based on a number of monitored accesses to each information model node;

identifying a weak association between two of the information model nodes based on the ranking of each of the plurality of information model nodes;

distributing the plurality of information model nodes between two or more of the plurality of memories in accordance with the weak association;

receiving, via the first business tier system, a plurality of requests to traverse the weak association to the second node;

calculating a number of the requests;

determining whether the number of requests exceeds a predetermined threshold; and when it is determined that the number of requests exceeds the predetermined threshold, re-ranking each of the plurality of information model nodes.

9. The computer-readable medium of claim 8, further comprising the steps of:

generating an access pattern for each information model node that includes the number of monitored accesses to the respective information model node; and storing the access pattern for each information model node in association with the respective node.

10. The computer-readable medium of claim 8, wherein the data processing system has a plurality of business tier systems operatively connected to a network, each of the business tier systems having a respective one of the plurality of memories, such that a first of the two information model nodes is distributed to a first of the business tier systems and a second of the two information model nodes is distributed to a second of the business tier systems.

11. The computer-readable medium of claim 10, further comprising the steps of:

receiving, via the first business tier system, a request to traverse the weak association to the second node; and redirecting the request to the second business tier system that has the second node.

12. The computer-readable medium of claim 10, further comprising the steps of:

receiving a query from the business service application to access one of the plurality of information model nodes; and directing the query to one of the business tier systems having the respective memory with the one information model node.

13. A computer-readable medium containing instructions for controlling a data processing system to perform a method, the data processing system having a business service application and a plurality of memories, the method comprising the steps of:

monitoring access to each of a plurality of information model nodes associated with the business service application;

ranking each of the plurality of information model nodes based on a number of monitored accesses to each information model node;

determining whether a first of the plurality of memories has space to store the two information model nodes, the first of the two information model nodes having a higher ranking than the second of the two information model nodes;

when it is determined that the first of the plurality of memories does not have space to store the two information model nodes, identifying a weak association between two of the information model nodes based on the ranking of each of the plurality of information model nodes, the identifying including determining that the two information model nodes have sequential rankings and wherein the weak association includes a pointer from one to another of the two information nodes; and distributing the plurality of information model nodes between two or more of the plurality of memories in accordance with the weak association.

14. The computer-readable medium of claim 13, wherein the step of distributing the plurality of information model nodes comprises the step of distributing each of the plurality of information model nodes having a ranking less than the ranking of the first node to a second of the plurality of memories.

15. The computer-readable medium of claim 14, wherein the step of distributing the plurality of information model nodes further comprises the step of storing each of the plurality of information model nodes having a ranking higher than or equal to the ranking of the first node in the first memory.

16. A data processing system, comprising:

a storage having a plurality of information model nodes;

a plurality of memories, at least one of the memories comprising a business service application associated with the information model nodes, and a usage profiler program that monitors access to each of a plurality of information model nodes associated with the business service application, ranks each of the plurality of nodes based on a number of monitored accesses to each node, identifies a weak association between two of the nodes based on the ranking of each of the plurality of information model nodes, and distributes the plurality of information model nodes between two or more of the plurality of memories in accordance with the weak association; and a processor that runs the usage profiler program, wherein the usage profiler program further generates an access pattern for each information model node so that each access pattern includes the number of monitored accesses to the respective information model node, and stores the access pattern for each information model node in association with the respective node.

17. The data processing system of claim 16, wherein the data processing system has a plurality of business tier systems operatively connected to a network, each of the business tier systems having a respective one of the plurality of memories, such that a first of the two information model nodes is distributed to a first of the business tier systems and a second of the two information model nodes is distributed to a second of the business tier systems.

18. The data processing system of claim 17, wherein the at least one of the memories includes a reference redirector program that receives, via the first business tier system, a request to traverse the weak association to the second node, and redirects the request to the second business tier system that has the second node, the processor being operatively configured to run the reference redirector.

19. The data processing system of claim 17, wherein the at least one of the memories includes a reference redirector program that receives, via the first business tier system, a plurality of requests to traverse the weak association to the second node, calculates a number of the requests, determines whether the number of requests exceeds a predetermined threshold, and, when it is determined that the number of requests exceeds the predetermined threshold, prompts the usage profiler program to re-rank each of the plurality of information model nodes, the processor being operatively configured to run the reference redirector.

20. The data processing system of claim 17, wherein the at least one of the memories includes a load balancer program that receives a query from the business service application to access one of the plurality of information model nodes, and directs the query to one of the business tier systems having the respective memory with the one information model node, the processor being operatively configured to run the balancer program.

21. A data processing system, comprising:
a storage having a plurality of information model nodes;
a plurality of memories, at least one of the memories comprising a business service application associated with the information model nodes, and a usage profiler program that monitors access to each of a plurality of information model nodes associated with the business service application, ranks each of the plurality of nodes based on a number of monitored accesses to each node, determines whether a first of the plurality of memories has space to store the two information model nodes, the first of the two information model nodes having a higher ranking than the second of the two information model nodes, when it is determined that the first of the plurality of memories does not have space to store the two information model nodes, identifies a weak association between two of the information model nodes based on the ranking of each of the plurality of information model nodes, and distributes the plurality of information model nodes between two or more of the plurality of memories in accordance with the weak association; and
a processor that runs the usage profiler program.

22. The data processing system of claim 21, wherein the usage profiler program distributes each of the plurality of information model nodes having a ranking less than the ranking of the first node to a second of the plurality of memories.

23. The data processing system of claim 21, wherein the usage profiler program stores each of the plurality of information model nodes having a ranking higher than or equal to the ranking of the fist node in the first memory.

* * * * *

UNITED STATES PATENT AND TRADEMARK OFFICE
CERTIFICATE OF CORRECTION

| | | |
|---|---|---|
| PATENT NO. | : 8,055,689 B1 | Page 1 of 1 |
| APPLICATION NO. | : 11/080896 | |
| DATED | : November 8, 2011 | |
| INVENTOR(S) | : Michael J. Wookey | |

It is certified that error appears in the above-identified patent and that said Letters Patent is hereby corrected as shown below:

Column 34, line 26, claim 23, delete "fist" and insert therefor --first--.

Signed and Sealed this
Twentieth Day of December, 2011

David J. Kappos
*Director of the United States Patent and Trademark Office*